US007703545B2

(12) United States Patent
Combs et al.

(10) Patent No.: US 7,703,545 B2
(45) Date of Patent: Apr. 27, 2010

(54) FIRE-FIGHTING MONITOR

(75) Inventors: Eric Combs, Cromwell, IN (US); James M. Trapp, Galien, MI (US)

(73) Assignee: Elkhart Brass Manufacturing Company, Inc., Elkhart, IN (US)

( * ) Notice: Subject to any disclaimer, the term of this patent is extended or adjusted under 35 U.S.C. 154(b) by 0 days.

(21) Appl. No.: 12/234,194

(22) Filed: Sep. 19, 2008

(65) Prior Publication Data

US 2009/0107687 A1 Apr. 30, 2009

Related U.S. Application Data

(62) Division of application No. 10/962,271, filed on Oct. 8, 2004.

(60) Provisional application No. 60/530,493, filed on Dec. 18, 2003, provisional application No. 60/510,747, filed on Oct. 14, 2003.

(51) Int. Cl.

| | |
|---|---|
| ***A62C 25/00*** | (2006.01) |
| ***A62C 27/00*** | (2006.01) |
| ***B05B 15/08*** | (2006.01) |
| ***F16D 23/00*** | (2006.01) |
| ***F16L 27/00*** | (2006.01) |

(52) U.S. Cl. ........................ 169/52; 169/24; 239/587.4; 239/587.5; 239/587.6; 192/41 R; 192/43; 285/264

(58) Field of Classification Search ................... 169/24, 169/25, 51, 52, 54; 239/273, 587.1–587.6; 192/41 R, 45.1, 46, 43, 43.1, 43.2, 44; 285/261, 285/263, 264

See application file for complete search history.

(56) References Cited

U.S. PATENT DOCUMENTS

| | | | |
|---|---|---|---|
| 557,799 | A | 4/1896 | Gorier |
| 978,107 | A | 12/1910 | Berry |
| 1,583,772 | A | 5/1926 | Blaw |
| 1,599,907 | A | 9/1926 | MacGregor |
| 1,880,272 | A | 10/1932 | Panther, Jr. |

(Continued)

FOREIGN PATENT DOCUMENTS

| | | |
|---|---|---|
| DE | 1952689 | 5/1971 |

(Continued)

*Primary Examiner*—Darren W Gorman
(74) *Attorney, Agent, or Firm*—Van Dyle, Gardner, Linn & Burkhart, LLP

(57) ABSTRACT

A fire-fighting monitor includes a first body having an internal passageway defining an inlet and an outlet, a coupler having an internal passageway defining an inlet and an outlet, the coupler being pivotally mounted to the body at the outlet of the body wherein the internal passageway of the coupler is in communication with the internal passageway of the body, and the coupler having at least one pivot axis. Further, the monitor includes a counterbalance device, which comprises an annular member mounted to the first body at the pivot axis. The counterbalance device further comprises a pivot member mounted to the coupler and a second unitary body mounted about the pivot member, with the second unitary body being adapted to engage and generate an interference with an inner surface of the annular member when the coupler is pivoted about the pivot axis in a first direction and adapted to release the interference with the inner surface of the annular member when the coupler is pivoted about said pivot axis in an opposed second direction from the first direction.

21 Claims, 18 Drawing Sheets

U.S. PATENT DOCUMENTS

| | | | |
|---|---|---|---|
| 1,961,481 | A | 6/1934 | Downs |
| 2,011,446 | A | 8/1935 | Judell |
| 2,111,553 | A | 3/1938 | Lain |
| 2,342,757 | A | 2/1944 | Roser |
| 2,986,344 | A | 5/1961 | Knight |
| 2,998,199 | A | 8/1961 | Miscovich |
| 3,106,247 | A | 10/1963 | Lacks et al. |
| 3,589,486 | A | 6/1971 | Kelch |
| 3,612,408 | A | 10/1971 | Holleman |
| 3,770,062 | A | 11/1973 | Riggs |
| 3,893,630 | A | 7/1975 | Bochmann et al. |
| 3,940,107 | A | 2/1976 | Allenbaugh, Jr. |
| 3,946,843 | A | 3/1976 | Downs |
| 4,007,793 | A | 2/1977 | Hux et al. |
| 4,392,618 | A | 7/1983 | Evans et al. |
| 4,506,738 | A | 3/1985 | Evans et al. |
| 4,553,869 | A | 11/1985 | Alexander et al. |
| 4,607,702 | A | 8/1986 | Miller |
| 4,674,686 | A | 6/1987 | Trapp |
| 4,697,742 | A | 10/1987 | Schnipke |
| 4,793,557 | A | 12/1988 | Marchese et al. |
| 4,975,993 | A | 12/1990 | Black et al. |
| 4,984,745 | A | 1/1991 | Akeel et al. |
| 5,042,628 | A | 8/1991 | Malecha |
| 5,211,245 | A | 5/1993 | Relyea et al. |
| 5,249,632 | A | 10/1993 | Sparling et al. |
| 5,301,756 | A | 4/1994 | Relyea et al. |
| 5,362,279 | A | 11/1994 | Galchefski |
| 5,425,505 | A | 6/1995 | Jones |
| 5,488,995 | A | 2/1996 | Kuwahara |
| 5,593,092 | A | 1/1997 | McMillian et al. |
| 5,626,194 | A | 5/1997 | White |
| 5,788,158 | A | 8/1998 | Relyea |
| 5,829,565 | A | 11/1998 | Fergie et al. |
| 6,095,801 | A | 8/2000 | Spiewak |
| 6,109,360 | A | 8/2000 | Mandzukic et al. |
| 6,305,620 | B1 | 10/2001 | Marchese |
| 6,305,621 | B1 | 10/2001 | Kolacz et al. |
| 6,354,320 | B1 | 3/2002 | Kolacz et al. |
| 6,655,613 | B1 | 12/2003 | Brown |
| 6,745,957 | B2 | 6/2004 | Parey |
| 6,786,426 | B1 | 9/2004 | Trapp |
| 7,137,578 | B2 | 11/2006 | Steingass et al. |
| 7,191,964 | B2 | 3/2007 | Trapp |
| 7,243,864 | B2 | 7/2007 | Trapp et al. |
| RE40,441 | E | 7/2008 | Kolacz et al. |
| 2002/0056602 | A1 | 5/2002 | Aurora |
| 2004/0216902 | A1 | 11/2004 | Trapp et al. |
| 2005/0145727 | A1 | 7/2005 | Steingass et al. |
| 2005/0167122 | A1 | 8/2005 | Trapp |

FOREIGN PATENT DOCUMENTS

| | | |
|---|---|---|
| DE | 29600355 | 6/1997 |
| GB | 485161 | 5/1938 |
| JP | 55146158 | 10/1980 |

FIRE-FIGHTING MONITOR

This application is a divisional application Ser. No. 10/962,271, filed Oct. 8, 2004, entitled FIRE-FIGHTING MONITOR by Applicants Eric Combs and James M. Trapp, which claims priority from provisional application Ser. No. 60/530,493, filed Dec. 18, 2003, entitled ONE-WAY CLUTCH AND FIRE FIGHTING MONITOR INCORPORATING SAME by Applicant Eric Combs and from provisional application Ser. No. 60/510,747, filed Oct. 14, 2003, entitled FIRE-FIGHTING MONITOR, by Applicant Eric Combs, which are herein incorporated by reference in their entireties.

TECHNICAL FIELD AND BACKGROUND OF THE INVENTION

The present invention is directed to a fire-fighting monitor and, more specifically, to a portable fire-fighting monitor that incorporates a safety system that controls the rotation of the monitor's nozzle to keep the monitor from overturning or moving due to the reaction force generated by the flow of fluid through the monitor.

Fire-fighting monitors include an inlet, which is connected to a hose or pipe, and a discharge outlet to which a nozzle or stream shaper is mounted. Monitors typically deliver a large quantity of fluid (typically water or foam) and, as a result, generate a reaction force that increases with an increase in the fluid flow and/or pressure. This reaction force extends in the opposite direction from the flow of the fluid and, therefore, can act on the monitor to create a moment about the base of the monitor, depending on the direction of the nozzle. For portable monitors, this reaction force can be destabilizing. When the nozzle is oriented so that the reaction force extends within the footprint (i.e. within the perimeter of the outer circumference of the monitor, which is defined by the ground contact points of the monitor's supports) of the monitor, there will be no destabilizing moment; though a translational force may be generated. However, when the reaction force does not pass through the footprint of a portable monitor, portable monitors are susceptible to overturning and/or sliding. Furthermore, the weight of the nozzle or stream shaper has a tendency to urge the nozzle or stream shaper to pivot downward, where the reaction force will have a greater tendency to tip or slide a portable monitor. While control over the flow of fluid through the monitor can reduce the reaction force to safe levels, conventionally portable monitors do not have manual shut-off valves. Instead, the flow of fluid through the monitor is limited through a valve at the fire truck or at the fire hydrant.

Various modifications have been proposed. However, many of these modifications increase the weight of the monitor and, further, complicate the assembly of the monitor. To facilitate the control of the reaction force, some monitors have incorporated one-way brakes. However, there is a need to provide a simplified assembly that can achieve greater control over the monitor, but without the attendant costs and complicated construction of some the prior art monitors.

SUMMARY OF THE INVENTION

Accordingly, the present invention provides a monitor that is adapted to control the direction of the reaction force that is generated by fluid flowing through the monitor so that the risk of the monitor being moved or overturned is reduced, if not eliminated. Furthermore, the monitor is adapted to harness the reaction force to control the position of the nozzle.

In one form of the invention, a fire-fighting monitor includes a housing, a nozzle coupler, and a pivot joint coupler, which mounts the nozzle coupler to the housing. The pivot joint coupler includes an internal passageway and a pivot member. The nozzle coupler is mounted to the pivot member and includes an internal passageway, which defines a discharge outlet. The pivot joint coupler is pivotally mounted to the housing at the outlet of the housing so that the internal passageway of the nozzle coupler is in communication with the internal passageways of the pivot coupler and housing. In addition, the pivot member includes a pivot axis at the outlet of the housing. The nozzle coupler has a central axis that defines a reference line from which the pivot axis is offset such that the reaction force generated by fluid flowing through the nozzle coupler generates a moment about the pivot axis, which overcomes the gravitational force acting at the nozzle coupler due to a nozzle or stream shaper that is mounted to nozzle coupler.

In one aspect, the pivot joint coupler includes a second pivot member, which has a second pivot axis. The nozzle coupler is mounted to the second pivot member of the pivot coupler wherein the nozzle coupler is pivotally mounted to the housing about at least two axes.

In another aspect, the first pivot member of the pivot joint coupler is configured with the housing to have a first stiffness about the first pivot axis. The second pivot member configured with the nozzle coupler to have a second stiffness about the second pivot axis, with the first stiffness being greater than the second stiffness wherein it is easier to pivot the nozzle coupler about the pivot joint coupler than to pivot the pivot joint coupler about the housing.

In one aspect, either one or both pivot members may comprise a ball member.

In another form of the invention, a fire-fighting monitor includes a housing, a nozzle coupler, and a double ball joint coupler. The double ball joint coupler has a first ball member pivotally mounted in the housing and a second ball member pivotally mounted in the nozzle coupler to thereby pivotally couple the nozzle coupler to the housing. The double ball joint coupler is configured such that the reaction force generated by fluid flowing through the nozzle coupler generates a counterbalancing moment about the pivot axis of the first ball member, which overcomes the gravitation force acting at the nozzle or stream shaper that is mounted to the nozzle coupler at the discharge outlet of the monitor and, with sufficient flow and/or fluid pressure, to lift the nozzle to an angle where the reaction force is no longer destabilizing to the monitor.

According to another form of the invention, a fire-fighting monitor includes a monitor body and a coupler that is pivotally mounted to the body at the outlet of the body wherein the internal passageway of the coupler is in communication with the internal passageway of the body. The monitor further includes a counterbalance device. The counterbalance device includes an annular member, such as a housing, which is mounted to the body. The counterbalance device further includes a pivot member mounted to the coupler at the pivot axis and a clutch body mounted about the pivot member, which is adapted to engage and generate an interference with an inner surface of the annular member when the coupler is pivoted about the pivot axis in a first direction and adapted to substantially release the interference with the inner surface of the annular member when the coupler is pivoted about the pivot axis in a second direction opposed from the first direction.

In one aspect, the body of the counterbalance device includes at least two fins, which are configured to engage and generate the interference with the inner surface of the annular member when the coupler is pivoted about the pivot axis in the first direction and adapted to release the interference with the inner surface of the annular member when the coupler is pivoted about the pivot axis in the second direction.

In another aspect, the fins comprise generally L-shaped fins. For example, the body of the counterbalance device may include a central portion, with each of the L-shaped fins comprising a first portion extending from the central portion and a second portion angled with respect to the first portion. The second portion of the fins are adapted to engage the inner surface of the annular member and generate the interference with the inner surface of the annular member when the coupler is pivoted about the pivot axis in the first direction and adapted to release from the interference with the inner surface of the annular member when the coupler is pivoted about the pivot axis in the second direction.

According to another aspect, the pivot member has an outer perimeter, with each of the fins being generally aligned with a tangent line to the outer perimeter of the pivot member. For example, the first portions may be generally aligned with the tangent lines.

In another aspect, the body comprises an aluminum body.

According to yet another aspect, the fins are configured to expand outwardly when the coupler is pivoted in the first direction and to compress and deflect inwardly when the coupler is pivoted in the second direction. For example, in preferred form the fins expand outwardly against the housing and function as columns when the coupler is pivoted in the first direction to thereby bind against the inner surface of the housing. When the coupler is pivoted in the second direction, the fins bend and function as beams or springs wherein the fins release the interference with the inner surface of the housing.

In preferred form, the second body and the fins are monolithic to thereby form a unitary part.

In yet another aspect, the clutch body includes a plurality of springs, which are compressible when the coupler is pivoted in the second direction and which are adapted to be substantially rigid when the coupler is pivoted in the first direction wherein the springs bind against the inner surface of the housing.

According to another form of the invention, a one-way clutch includes an annular wall, which is fixed to a first member, a pivot member, which is fixed to a second member with one of the first and second members being pivotal with respect to the other, and a body, which is mounted about the pivot member. The pivot member is aligned with a pivot axis. The body includes a plurality of springs that contact and generate an interference with the inner surface of the annular wall when the pivot member or the annular wall pivots about the pivot axis in a first direction to thereby generate a first stiffness about the pivot axis in the first direction and to at least substantially release their interference with the inner surface of the annular wall when the pivot member or the annular wall is pivoted about the pivot axis in a second direction opposed from the first direction to thereby allow the pivot member or the annular wall to pivot about the pivot axis with a second stiffness.

In one aspect, the springs comprise fins. For example, the fins may comprise generally L-shaped fins.

In other aspects, the body and the springs comprise a monolithic member to form a unitary part.

Accordingly, as would be understood, the monitor of the present invention provides a monitor with a more stable configuration that reduces the risk of the monitor being tipped over or sliding. The one-way clutch of the present invention provides a simple assembly with a reduced number of parts over conventional one-way brakes and that exhibits reduces wear over some conventional one-way brakes. The one-way clutch can be used as a counterbalance device in a monitor to provide the monitor with a more stable configuration that reduces the risk of the monitor being tipped over or sliding when being used.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Figure 1:
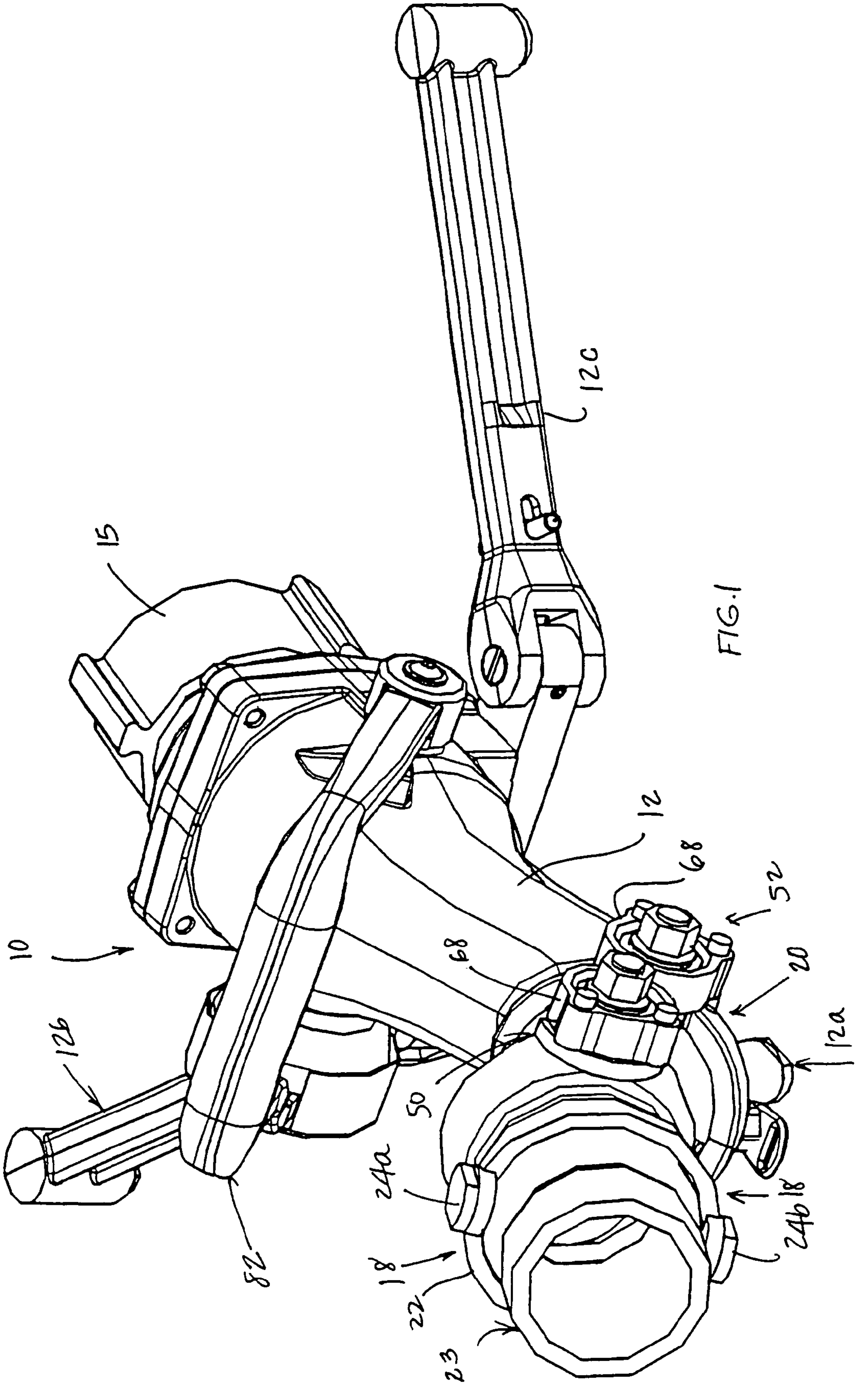
FIG. 1 is a perspective view of a monitor of the present invention incorporating a counterbalance device of the present invention.

Referring to FIG. 1, the numeral 10 generally designates a monitor of the present invention. As will be more fully described below, monitor 10 is adapted to exhibit increased stability by controlling the angle at which the nozzle or stream shaper that is mounted to the monitor can be rotated to limit the sliding and/or overturning force that can be generated by the flow of fluid flowing through the monitor. Furthermore, monitor 10 is configured so that the reaction force generated by the flow of fluid through the monitor is used to help stabilize the monitor.

Referring to FIGS. 1-4, monitor 10 includes a housing or body 12 and a nozzle coupler 18, which is pivotally mounted to body 12 and to which a nozzle or stream shaper (not shown) is mounted. For ease of description, reference hereafter will be made to a nozzle that is mounted to nozzle coupler 18, though it should be understood that a stream shaper may also be mounted to nozzle coupler 18. Mounted to body 12 are three monitor supports 12*a*, 12*b*, and 12*c*, which provide a three-point support for monitor 10. Support 12*a* comprises a fixed support leg that is mounted to body 12 in a threaded boss. Supports 12*b* and 12*c* comprise legs that are pivotally mounted to opposed flanges, which are mounted to or formed on body 12, and pivotally mounted to the flanges about vertical axes to permit horizontal pivoting of the legs with respect to body 12. Each support 12*a*, 12*b*, and 12*c* preferably includes a conical or pointed ground engagement spike so that when monitor 10 is placed on the ground, depending on the ground, the supports may dig into the ground to provide some lateral stability to the monitor. As will be more fully described below, nozzle coupler 18 is mounted to body 12 in a manner to provide multiple axis pivoting of the nozzle coupler and, hence, of the nozzle, and further in a manner to control the angle of the nozzle coupler and the nozzle to provide a more stable monitor.

Figure 2:
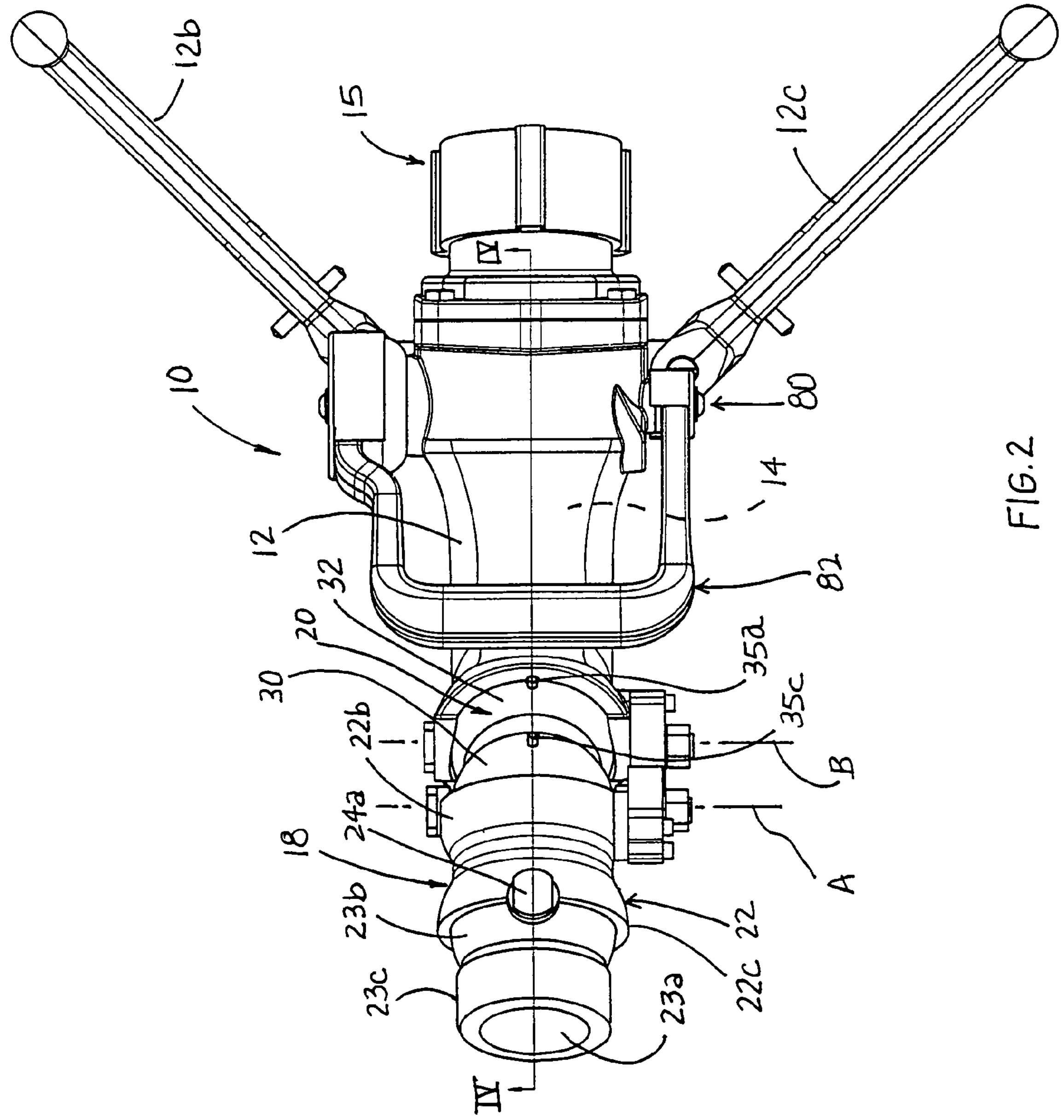
FIG. 2 is a top-plan view of the monitor of FIG. 1.
Figure 3:
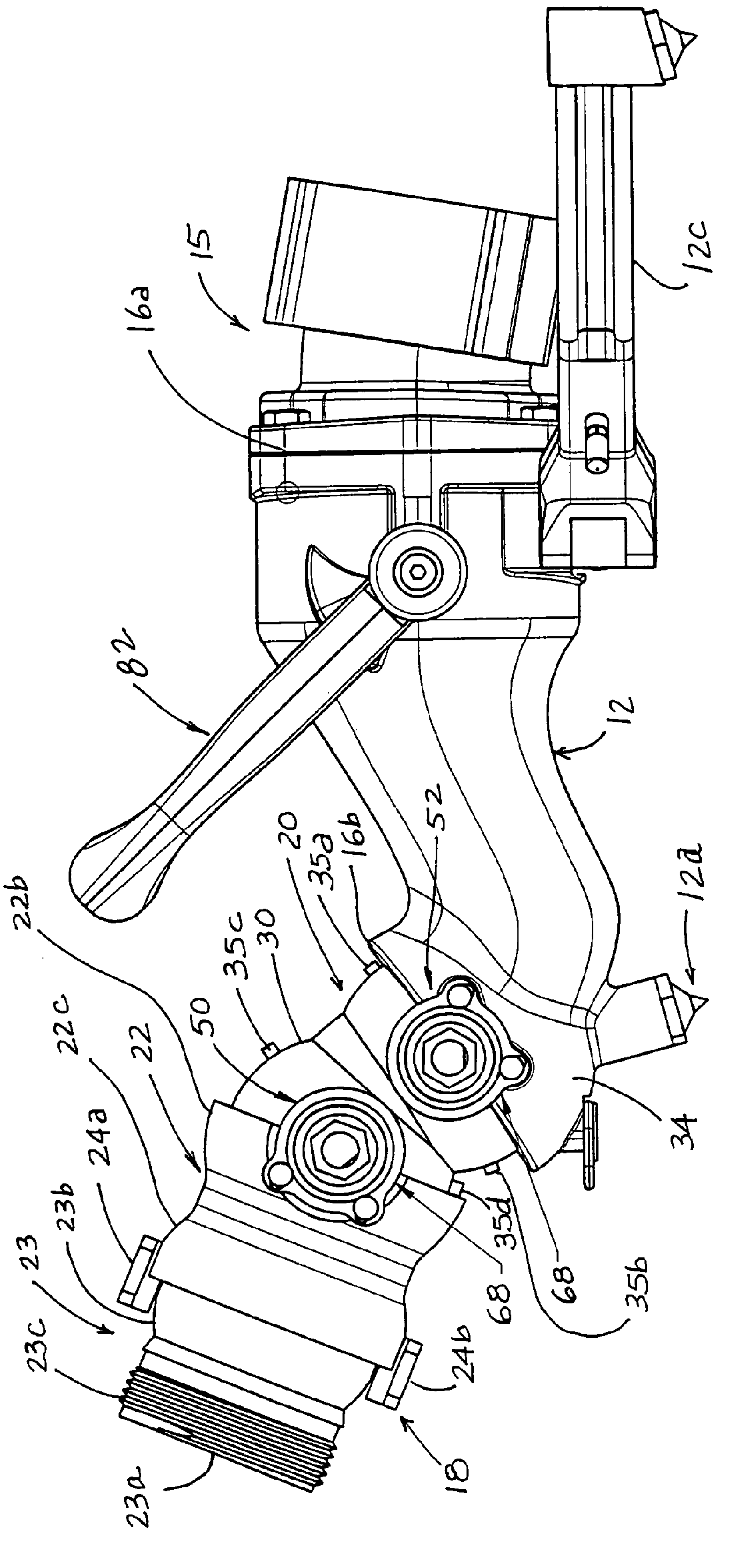
FIG. 3 is a side elevation view of the monitor of FIG. 2.
Figure 4:
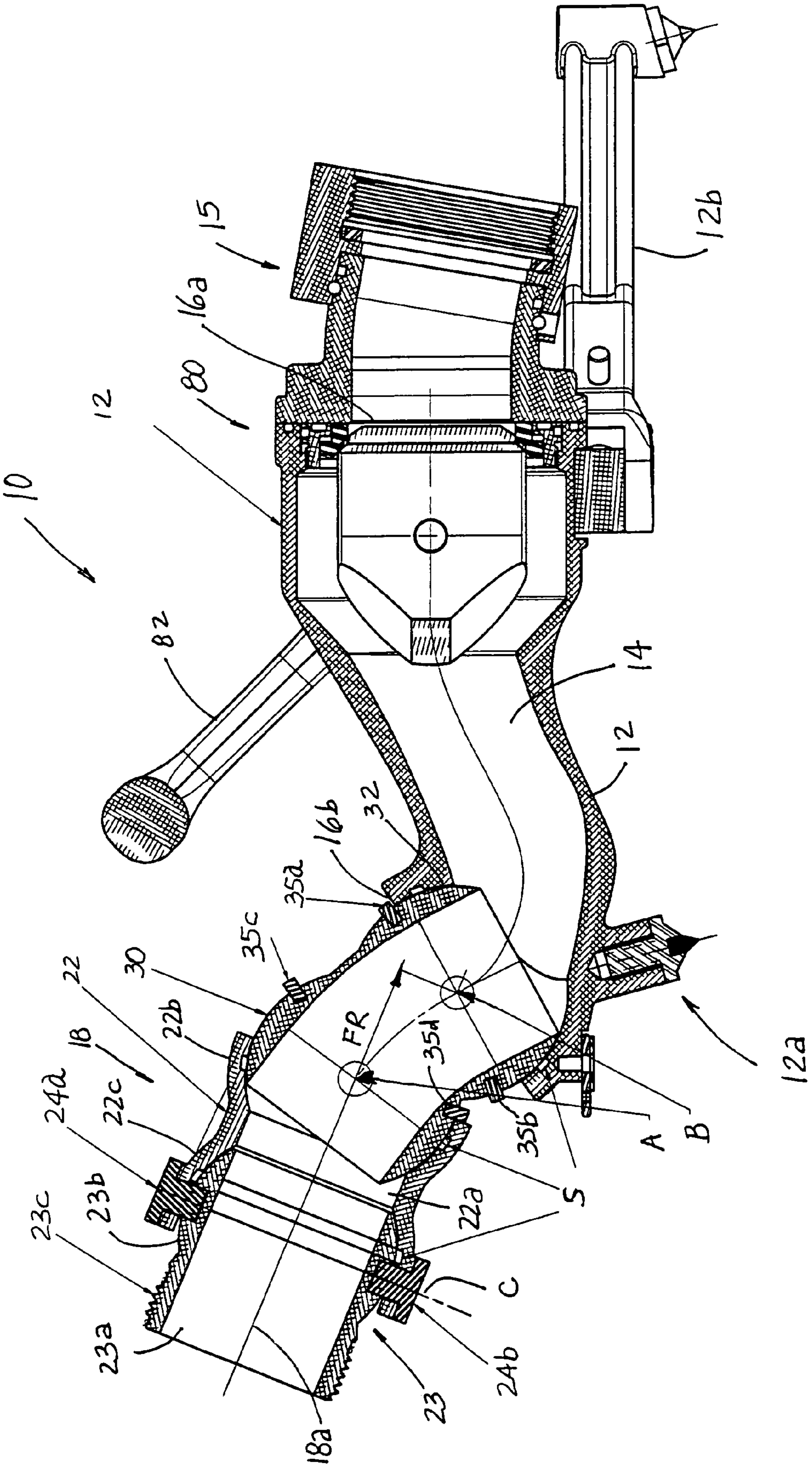
FIG. 4 is a cross-section view taken along line IV-IV of FIG. 2.

As best seen in FIG. 4, body 12 includes a transverse passage 14 that defines an inlet 16*a* on one end of body 12 for coupling to an inlet cap 15, which allows monitor 10 to be mounted to a hose, and an outlet 16*b* on the other end of body 12. Nozzle coupler 18 is mounted to outlet 16*b* by a pivot joint coupler 20, which permits nozzle coupler 18 to pivot with respect to body 12 about two or more axes. In the illustrated embodiment, pivot joint coupler 20 comprises a double or dual pivot joint coupler that allows the nozzle coupler 18 to pivot about two horizontal axes, namely axis A and axis B (FIGS. 2-4). However, it should be understood that coupler 20 may include additional pivot axes, including horizontal and/or vertical pivot axes.

Nozzle coupler 18 includes a first body 22 and a second body 23, which provides a mount for the nozzle and which is pivotally mounted to first body 22 about a generally vertical axis C by a pair of pivot members, such as pivot bolts 24*a* and 24*b*, to allow the nozzle to be moved, for example generally horizontally, with respect to nozzle coupler 18. Body 22 includes an internal passageway 22*a* and first and second pivot members 22*b* and 22*c*. Similarly, second body 23 includes an internal passageway 23*a*, which is in communication with the internal passageway of body 22 and defines a discharge outlet. First pivot member 22*b* of first body 22 pivotally mounts nozzle coupler 18 to pivot joint coupler 20. Body 23 also includes a pivot member 23*b*, which is pivotally mounted to body 22 in second pivot member 22*c* about a generally vertical axis C, and a threaded end 23*c* for mounting a nozzle to nozzle coupler 18. In this manner, the nozzle is pivotal with respect to body 22 about at least one axis and pivotal with respect to body 12 about at least three axes, namely axes A, B, and C. However, as previously noted, additional pivot axes may be provided. Alternately, the number of pivot axes may be reduced. For example, a single pivot axis may be provided in which case the nozzle may be configured and angled to provide an offset so that the reaction force generated by the flow of fluid through the nozzle is offset from the pivot axis to create a similar counterbalancing moment. In the illustrated embodiment, pivot members 22*b* and 22*c* comprise socket members, while pivot member 23*b* comprises a ball member; however, it should be understood that the types of pivot members may be reversed—with the pivot member 23*b* comprising a socket member and pivot members 22*b* and 22*c* comprising ball members; though the range of motion of the nozzle and nozzle coupler may be affected.

As noted above, pivot joint coupler 20 permits repositioning of nozzle coupler 18 about two or more axes with respect to body 12, and, in the illustrated embodiment, includes two pivot members 30 and 32, with pivot member 30 pivotally mounted to pivot member 22*b* of nozzle coupler 18 and pivot member 32 pivotally mounted to body 12 at outlet 16*b*. In this manner, nozzle coupler 18 is pivotal with respect to body 12 about axes A and B, which permit vertical pivoting of the nozzle. Again in the illustrated embodiment, outlet 16*b* of body 12 comprises a socket member 34, while pivot members 30 and 32 comprise ball members. However, it should be understood that the types of pivot members may be reversed. In addition, although pivot joint coupler 20 is illustrated as a double ball joint coupler, with two ball members, it can be appreciated that the number and type of pivot members may be varied.

As will be more fully described below, axes A and B are offset such that the reaction force generated by the fluid flowing through nozzle coupler 18 will generate a counterbalancing moment about axis B. This counterbalancing moment will cause the second pivot member 32 of double pivot coupler 20 to rotate upward about axis B once there is sufficient flow of fluid through the monitor. At low flows, the reaction force is relatively low and, therefore, may not be of sufficient magnitude to pivot coupler 20. But at low flows, the reaction force is not sufficient to destabilize monitor 10.

Referring again to FIG. 4, the central longitudinal axis 18*a* of nozzle coupler 18 extends through axis A and, further, defines a reference line, which is aligned with the direction of the reaction force FR generated by fluid flowing through nozzle coupler 18 and exiting through the nozzle. Reaction force FR is offset from axis B, which generates a clockwise moment about axis B (as viewed from FIG. 4). As noted previously, when fluid is flowing through the monitor, the flow may have a relatively low pressure and flow rate; hence, the reaction force is relatively low. As a result, the gravitational forces acting on the nozzle and nozzle coupler will urge the nozzle and nozzle coupler downward. As the flow rate and/or pressure increases, the reaction force will increase to thereby increase the counterbalancing moment generated about axis B. The lower the angle the greater the moment arm and, hence, the greater the counterbalancing moment. Once the magnitude of the counterbalancing moment is sufficient to overcome the gravitational force acting at nozzle coupler 18, couplers 18 and 20, and the nozzle mounted to nozzle coupler 18, will rotate about horizontal axis B to thereby left the nozzle and nozzle coupler. Thus, the reaction force is no longer destabilizing to the monitor and, instead, is repositioned to stabilize the monitor. However, left unchecked, the clockwise moment would continue to cause pivot member 32 to rotate upward as viewed from FIG. 4.

To limit the upward rotation of coupler 20 and pivot member 32 about axis B, pivot member 32 is provided with a pair of stops 35*a* and 35*b*. Stops 35*a* and 35*b* may comprise pins, shoulders, or collars, which may be formed on or mounted to pivot member 32. Although illustrated as external stops, the stops may be positioned internally in socket 34 of body 12. In addition, monitor 10 includes a counterbalance device 50, 52 for each horizontal axes of rotation (A, B). As will be more fully described below, counterbalance devices 50, 52 allow pivoting in one direction but limit pivoting in the other direction by providing rotational stiffness in the other direction. In the illustrated embodiment, counterbalancing devices 50, 52 permit generally free upward rotation or clockwise rotation (as viewed in FIG. 4) about axes A and B, but limit downward rotation or counter-clockwise rotation (as viewed in FIG. 4). For ease of description, reference hereinafter will be made to counterbalance device 50.

Figure 5:
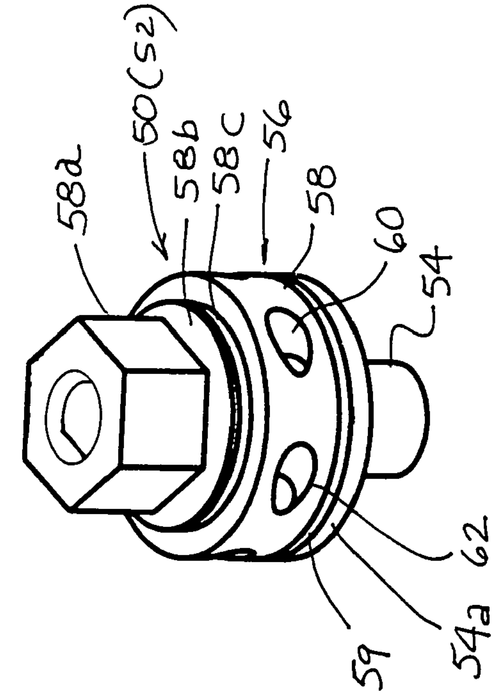
FIG. 5 is an enlarged perspective view of the clutch of the counterbalance assembly of the monitor.
Figure 7:
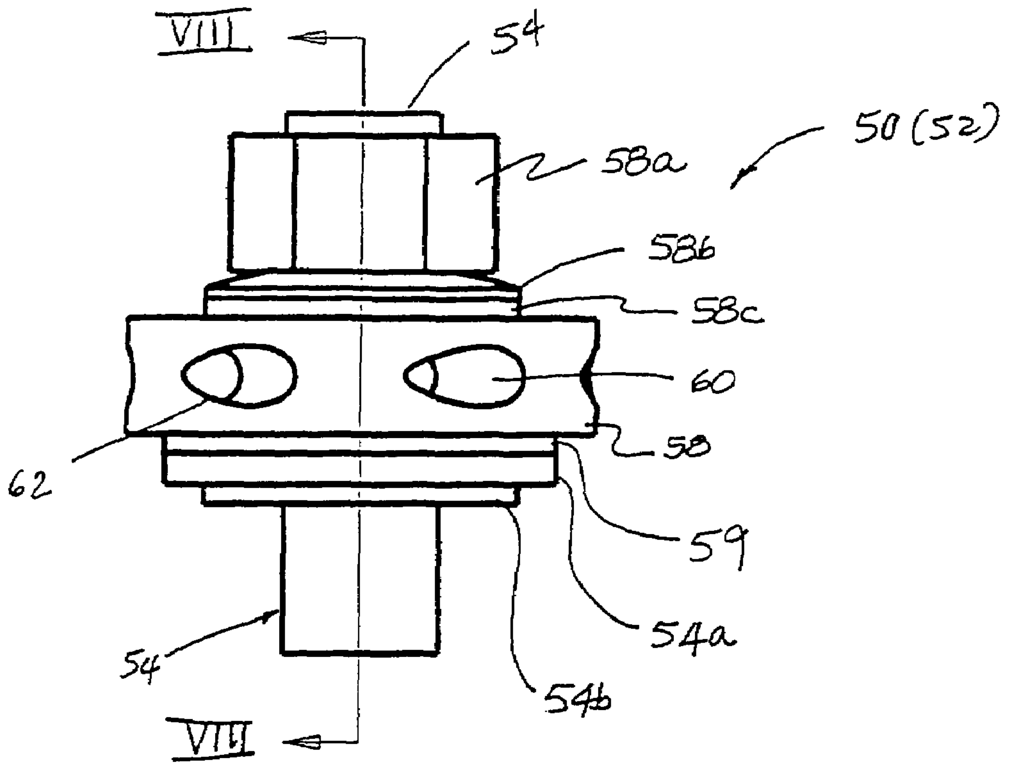
FIG. 7 is an elevation view of the clutch of FIG. 5.
Figure 8:
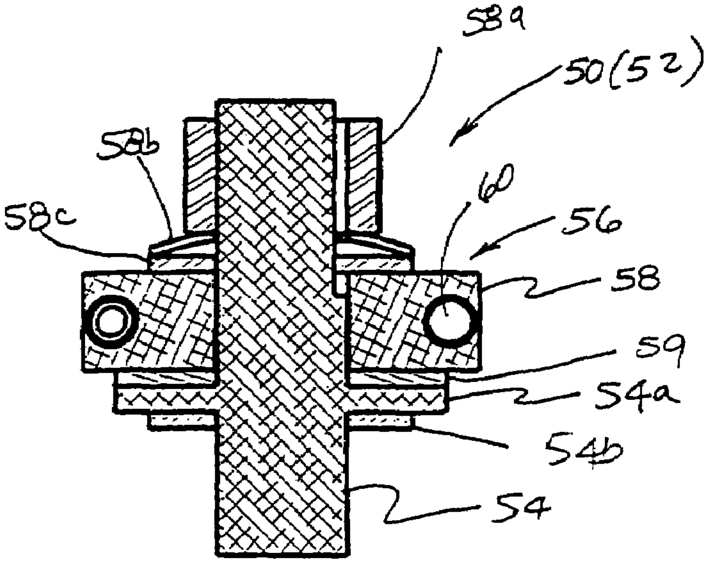
FIG. 8 is a cross-section taken along line VIII-VIII of FIG. 7.

As best seen in FIGS. 5 and 7, counterbalance device 50 includes a cylindrical member or trunnion 54, which is fixed to pivot member 30, and a clutch assembly 56 that is adapted to allow pivoting of cylindrical member 54 and, hence, pivot member 30 about one direction but limits pivoting in the opposed direction. Cylindrical member 54 includes an annular flange 54*a* on which clutch assembly 56 is mounted onto cylindrical member 54. Clutch assembly 56 includes an annular member 58 that is mounted onto flange 54*a* by a nut 58*a*, which urges annular member 58 toward flange 54*a* and into frictional engagement with friction washer 59, which is mounted on cylindrical member 54 and positioned between flange 54*a* and clutch assembly 56. Positioned between nut 58*a* and annular member 58 are a spring washer 58*b* and a notched washer 58*c*, which prevent backing-off of nut 58*a*.

Figure 6:
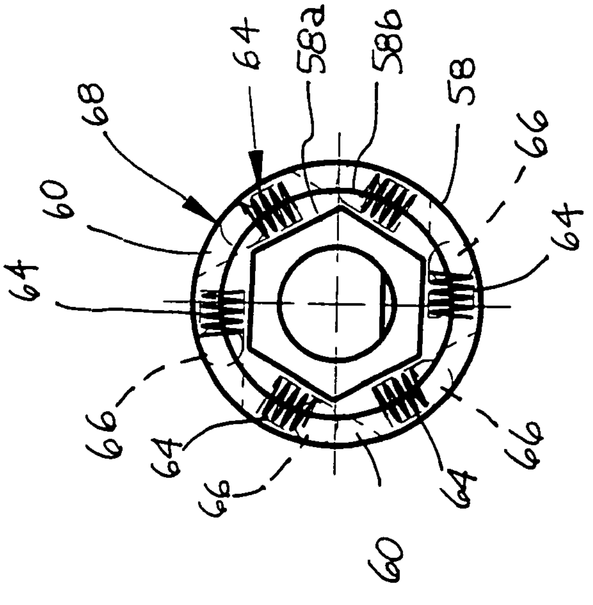
FIG. 6 is a top plan view of the clutch of FIG. 5.

As best seen in FIGS. 6 and 7, clutch assembly 56 includes a plurality of recesses 60 that extend into annular member 58 at an oblique angle with respect the radii of annular member 58 and form generally elliptical-shaped openings 62 at the outer perimeter of annular member 58. Positioned in each recess 60 are a spring 64 and a spherical member 66. Positioned over annular member 58 is a cylindrical housing 68, which is fixed relative to pivot member 22*b* of nozzle coupler 18. Housing 68 may be mounted to or formed as a part of pivot member 22*b*. Similarly, the housing for counterbalance device 52 may be mounted or formed as part of socket 34 of housing 12. When annular member 58 is positioned in cylindrical housing 68, spherical members 66 make an angled contact with the inner surface of housing 68 to permit generally free rotation in one direction. However, spherical members 66 bind against the inner surface of housing 68 when rotated in the opposite direction under the biasing forces of springs 64. To reduce the friction between flange 54*a* and pivot member 22*b* (and similarly with housing 12), counterbalance device 50 also includes a low friction washer 54*b*, such as a TEFLON washer, which is positioned between flange 54*a* and pivot member 22*b*.

In this manner, nozzle coupler 18 may be rotated upward or clockwise (as viewed in FIG. 4) about pivot axis A but is subject to rotational stiffness when rotated downward or in the counterclockwise direction as viewed in FIG. 4. As would be understood, therefore, an operator of the monitor of the present invention can relatively easily adjust the upward movement of the nozzle mounted to the monitor, but to adjust the nozzle downward must exert a downward force that is sufficient to overcome the rotational stiffness provided by counterbalance device 50 to pivot nozzle coupler 18 about axis A and sufficient to overcome the counterbalancing moment created by the reaction force generated by fluid flowing through monitor 10 and the rotational stiffness provided by counterbalance device 52 to pivot the pivot joint coupler 20 about axis B.

Counterbalance devices 50 and 52, therefore, permit relatively free clockwise rotation of nozzle coupler 18 (as viewed in FIG. 4) about pivot member 30 and of pivot member 32 about housing 12, but limit counter-clockwise rotation of nozzle coupler 18 (as viewed in FIG. 4) about pivot member 30 and of pivot member 32 about housing 12 unless acted upon by a sufficient force to overcome the friction between the annual members and the washers mounted on trunnions 54.

As would be understood, in operation, when fluid flows through monitor 10 and flows with sufficient flow and/or pressure to generate a reaction force sufficient to counteract the gravitational force acting on the nozzle and nozzle coupler, the nozzle, nozzle coupler 18, and joint coupler 20 will pivot about axis B so as to stabilize the monitor. To move the nozzle downward, as note above, a downward manual force will need to be applied to the nozzle. Optionally, counterbalance devices 50 and 52 may be configured to provide a different stiffness to axes A and B to control where the where rotation or pivoting will initiate. As would be understood, when a force is applied to the nozzle (or nozzle coupler) the initial rotation will occur at the axis with the lower stiffness.

In preferred form, counterbalance device 50 generates a smaller rotational stiffness than counterbalance device 52 to assure rotation initiates at pivot axis A. Therefore, when a downward force is applied to the nozzle (or nozzle coupler) of sufficient magnitude to overcome the rotational stiffness provided by counterbalance device 50, nozzle and nozzle coupler 18 will pivot about axis A. To limit rotation of nozzle coupler 18 about coupler 20, pivot member includes a pair of stops 35*c* and 35*d* (FIG. 3). Once nozzle coupler 18 is pivoted downward about axis A and contacts stop 35*d*, further application of a downward force, provided that it is of sufficient magnitude to overcome the counterbalance moment generated by the offset reaction force and the rotational stiffness of counterbalance device 52, will cause coupler 20 then to pivot about axis B. However, once the applied force is released, the offset reaction force will again return the nozzle and nozzle coupler to their raised position to assure that monitor 10 remains stable.

The degree of rotation of the nozzle coupler and, hence the nozzle, may be selected by the location of stops 35*c*, 35*d*. For example, in the illustrated embodiment, stops 35*c* and 35*d* are located to allow the nozzle and nozzle coupler 18 to rotate between about 60° and 30° at axis A. Once the nozzle coupler 18 reaches 30°, pivot member 22*b* will hit stop 35*d* and, thereafter, rotation will have to occur about axis B. Further rotation about axis B occurs until stop 35*b* contacts body 12. In the illustrated embodiment, stop 35*b* is positioned to permit coupler 20 to pivot about 10° so that the total range of motion for the nozzle is between about 20° and 60° as measured from the horizontal in the clockwise direction as viewed in FIG. 4. However, it should be understood that any of these angles may be varied.

Furthermore, it should be noted that the effect of the safety device of the present invention is self-limiting and that at a low flow and low pressure, reaction forces will be relatively low and, therefore, not be destabilizing for the monitor. Hence, the nozzle and nozzle coupler 18 may remain at a lowered angle. However, at high flow and high pressure, the reaction force will be such that it generates a counteracting moment to raise the nozzle and nozzle coupler so as to stabilize the monitor.

Optionally and preferably, monitor 10 also includes a ball valve 80, which may be used to control the flow of fluid through the monitor. For example, ball valve 80 may be operated by handle 82, which is pivotally mounted to housing 12 and which operates the gate 84 of the ball valve 82 to open or close the inlet of body 12 when pivoted with respect to housing 12.

From the foregoing, it should be appreciated that the monitor of the present invention provides a safety system that reduces, if not eliminates, the likelihood of the monitor tipping over or sliding due to the reaction force generated by the flow of fluid through the monitor. Moreover, monitor 10 uses or harnesses the reaction force to enhance the stability of the monitor by shifting or moving the reaction force. As would be understood, the degree of offset of the pivot axes of the pivot joint coupler will increase or decrease the magnitude of counterbalancing moment generated by the offset reaction force. Also, the point at which the counterbalancing force lifts the nozzle and the nozzle coupler will vary with the type of nozzle configuration being used and the flow rate and pressure of the fluid.

Figure 9:
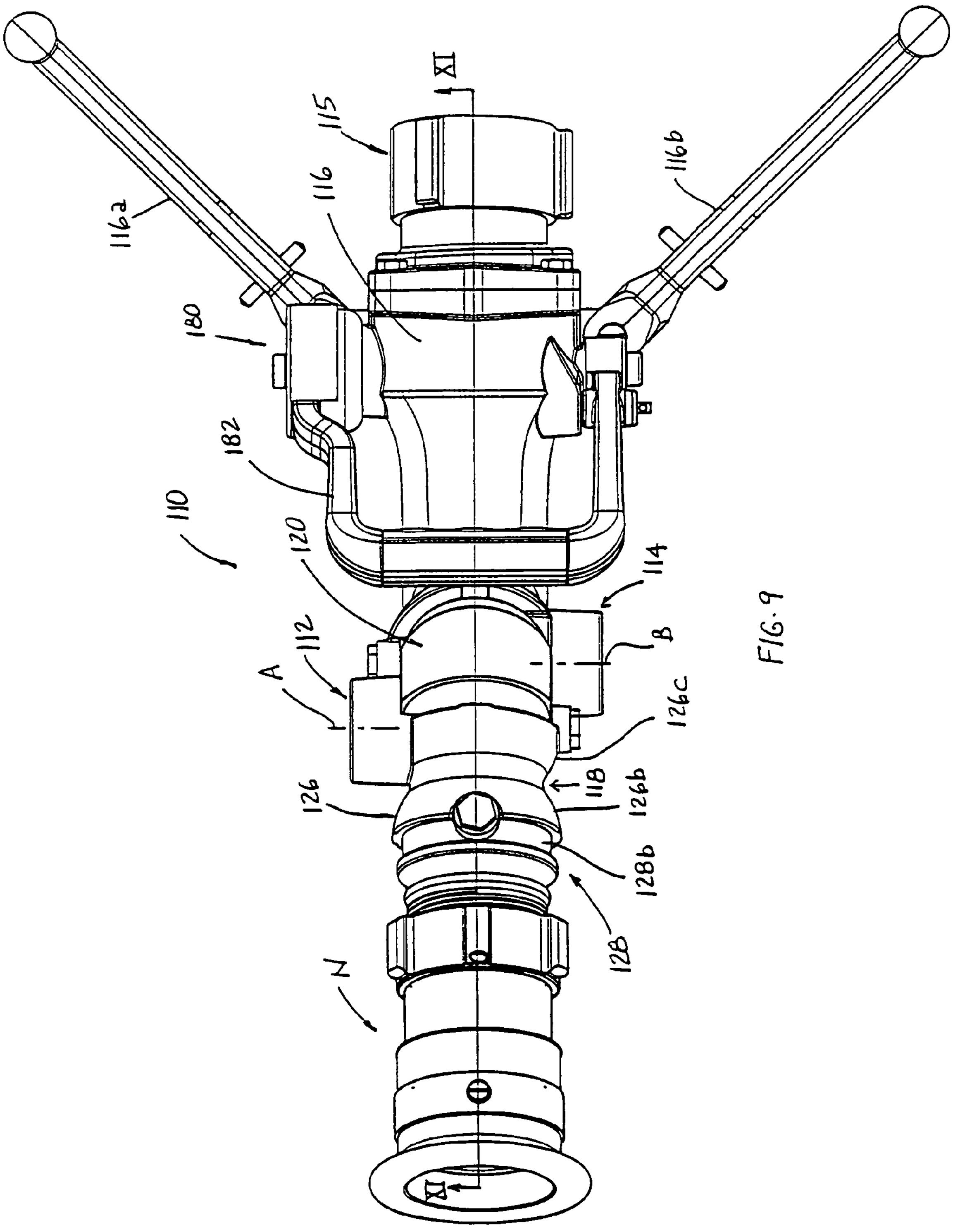
FIG. 9 is a top plan view of another embodiment of a monitor incorporating another embodiment of a counterbalance device of the present invention.

Referring to FIG. 9, the numeral 110 generally designates another monitor of the present invention, which has a similar configuration to monitor 10. Similarly, monitor 110 is adapted to exhibit increased stability by harnessing the reaction force generated by the flow of fluid through the monitor to stabilize the monitor. In addition, monitor 110 incorporates one-way clutches that provide counterbalance devices 112, 114 to control the angle at which the nozzle or stream shaper that is mounted to the monitor can be rotated to limit the sliding and/or overturning force that can be generated by the flow of fluid through the monitor. As will be more fully described below, counterbalancing devices 112, 114 have a simplified configuration over prior one-way breaks and are, therefore, easier to assemble. Furthermore, because of the fewer components and simplified construction, counterbalance devices 112, 114 have been found to exhibit greater wear characteristics over the prior art devices.

Referring to FIGS. 9-12, monitor 110 includes a housing or body 116, a nozzle coupler 118 to which a nozzle or stream shaper N is mounted, and a pivot joint coupler 120, which pivotally mounts nozzle coupler 118 to body 116. For ease of description, reference hereafter will be made to a nozzle that is mounted to nozzle coupler 118. As will be more fully described below, nozzle coupler 118 is mounted to body 116 in a manner to provide multiple axis pivoting of the nozzle coupler and, hence, of the nozzle. In addition, the pivoting of nozzle coupler 118 about body 116 is controlled by counterbalance devices 112 and 114, described below.

Similar to the first embodiment, mounted to body 116 are three monitor supports **116*a*, 116*b*, and 116*c*, which provide a three-point support for monitor 110. Support 116*c* comprises a fixed support leg that is mounted to body 116 in a threaded boss. Supports 116*a* and 116*b* comprise legs that are pivotally mounted to opposed flanges, which are mounted to or formed on body 116, and pivotally mounted to the flanges about vertical axes to permit horizontal pivoting of the legs with respect to body 116. Each support 116*a*, 116*b*, and 116*c* preferably includes a conical or pointed ground engagement spikes so that when monitor 10** is placed on the ground, depending on the ground, the supports may dig into the ground to provide some lateral stability to the monitor.

Figure 10:
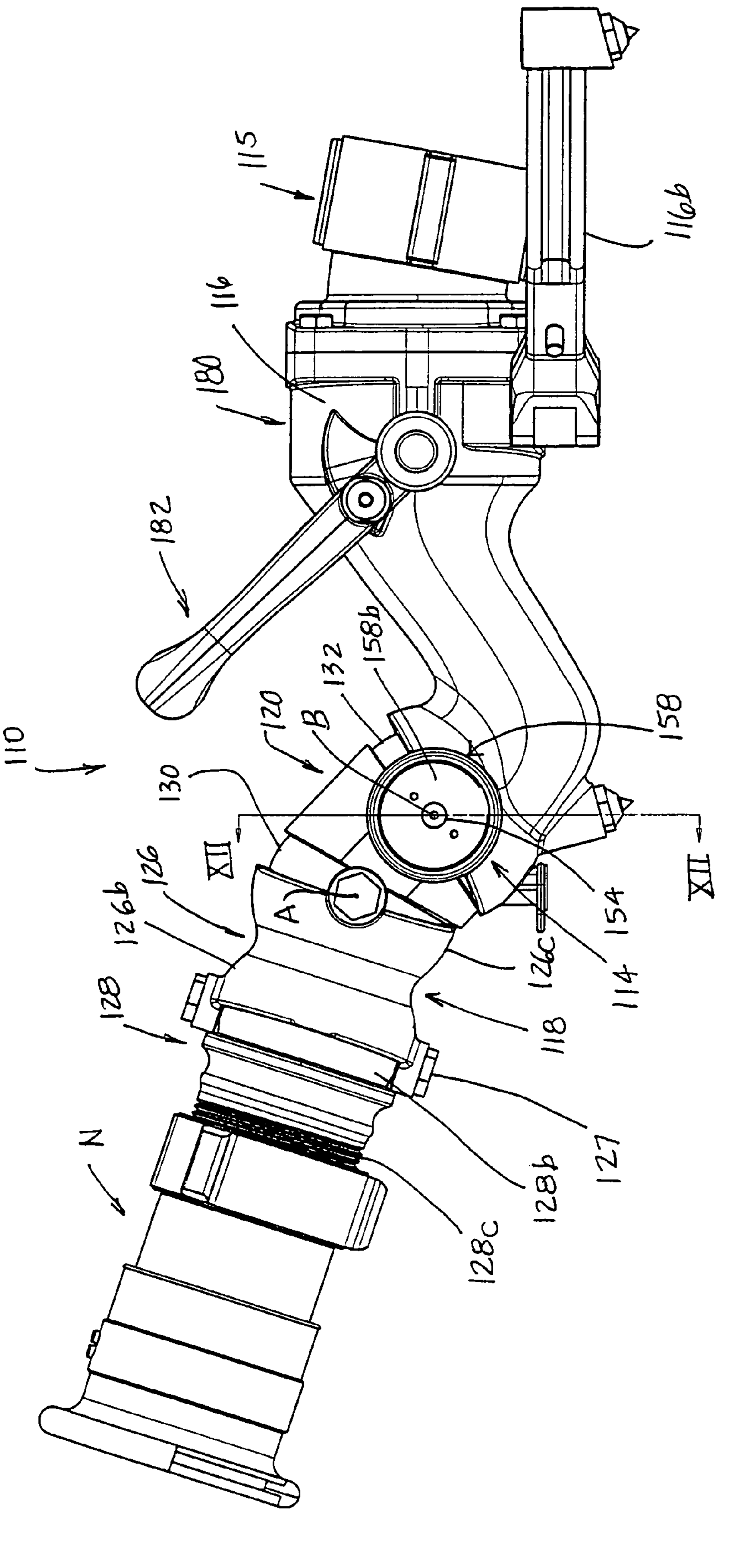
FIG. 10 is a side elevation view of the monitor of FIG. 9.
Figure 11:
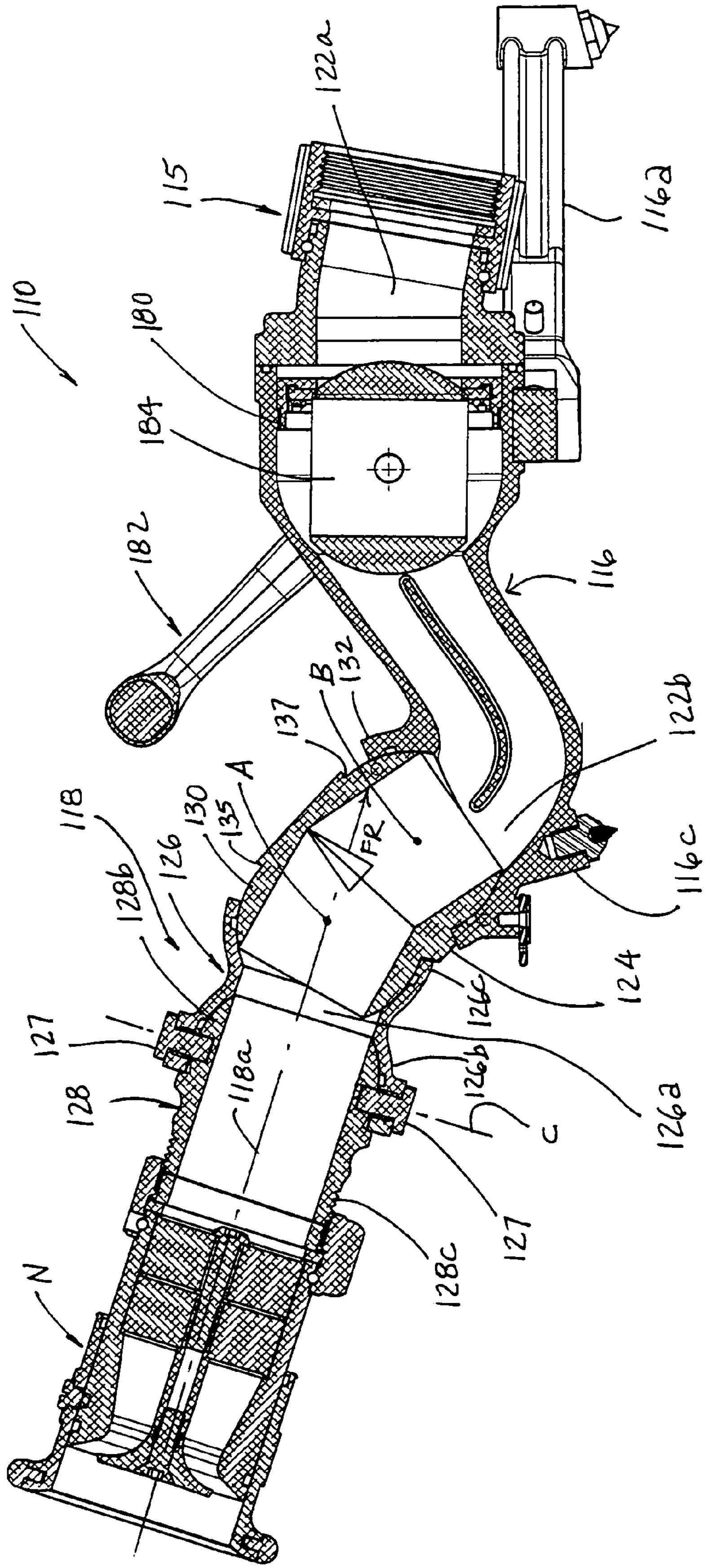
FIG. 11 is a cross-section view taken along line XI-XI of FIG. 9.

As best seen in FIG. 11, body 116 includes a transverse passage 122 that defines an inlet **122*a* on one end of body 116 for coupling to an inlet cap 115, which allows monitor 110 to be mounted to a hose, and an outlet 122*b* on the other end of body 116. Nozzle coupler 118 is mounted to outlet 122*b* by pivot joint coupler 120, which permits nozzle coupler 118 to pivot with respect to body 116 about one or more axes. In the illustrated embodiment, pivot joint coupler 120 comprises a double or dual pivot joint coupler that allows the nozzle coupler 118 to pivot about two horizontal axes, namely axis A and axis B (FIG. 10). However, it should be understood that coupler 120** may include additional pivot axes, including horizontal and/or vertical pivot axes.

Nozzle coupler 118 includes a first body 126 and a second body 128, which provides a mount for the nozzle and which is pivotally mounted to first body 126 about an axis C (FIG. 11) by a pair of pivot members, such as pivot bolts 127, to allow the nozzle to be moved, for example generally horizontally, with respect to nozzle coupler 118. Body 126 includes an internal passageway **126*a* and first and second pivot members 126*b* and 126*c*. Similarly, second body 128 includes an internal passageway 128*a*, which is in communication with the internal passageway of body 126 and defines a discharge outlet. Pivot member 126*c* of first body 126 pivotally mounts nozzle coupler 118 to pivot joint coupler 120. Body 128 also includes a pivot member 128*b*, which is pivotally mounted to body 126 in second pivot member 126*b* about a generally vertical axis C, and a threaded end 128*c* for mounting nozzle N to nozzle coupler 118. In this manner, nozzle N is pivotal with respect to body 126 about at least one axis and pivotal with respect to body 116** about at least three axes, namely axes A, B, and C. However, as previously noted, additional pivot axes may be provided. Alternately, the number of pivot axes may be reduced. For example, a single pivot axis may be provided in which case the nozzle may be configured and angled to provide an offset so that the reaction force generated by the flow of fluid through the nozzle is offset from the pivot axis to create a similar counterbalancing moment to that described below.

In the illustrated embodiment, pivot members **126*b* and 126*c* comprise socket members, while pivot member 128*b* comprises a ball member; however, it should be understood that the types of pivot members may be reversed—with the pivot member 128*b* comprising a socket member and pivot members 126*b* and 126*c*** comprising ball members (though the range of motion of the nozzle and nozzle coupler may be affected).

As noted above, pivot joint coupler 120 permits repositioning of nozzle coupler 118 about two or more axes with respect to body 116, and, in the illustrated embodiment, includes two pivot members 130 and 132, with pivot member 130 pivotally mounted to pivot member **126*c* of nozzle coupler 118 and pivot member 132 pivotally mounted to body 116 at outlet 122*b*. Again in the illustrated embodiment, outlet 122*b* of body 116 comprises a socket member 134, while pivot members 130 and 132 comprise ball members. However, it should be understood that the types of pivot members may be reversed. In addition, although pivot joint coupler 120** is illustrated as a double ball joint coupler, with two ball members, it can be appreciated that the number and type of pivot members may be varied.

As described about in reference to the first embodiment, axes A and B are offset such that the reaction force generated by the fluid flowing through nozzle coupler 118 will generate a counterbalancing moment about axis B. This counterbalancing moment will cause the second pivot member 132 of pivot joint coupler 120 to rotate upward about axis B once there is sufficient flow of fluid through the monitor. At low flows, the reaction force is relatively low and, therefore, may not be of sufficient magnitude to pivot coupler 120 about axis B. But at low flows, the reaction force is not sufficient to destabilize monitor 110.

Referring again to FIG. 11, the central longitudinal axis **118*a* of nozzle coupler 118 extends through axis A and, further, defines a reference line, which is aligned with the direction of the reaction force FR generated by fluid flowing through nozzle coupler 118 and exiting through the nozzle. Reaction force FR is offset from axis B, which generates a clockwise moment about axis B (as viewed from FIG. 11). As noted previously, when fluid is flowing through the monitor, the flow may have a relatively low pressure and flow rate; hence, the reaction force is relatively low. As a result, the gravitational forces acting on the nozzle and nozzle coupler will urge the nozzle and nozzle coupler downward. As the flow rate and/or pressure increases, the reaction force will increase to thereby increase the moment generated about axis B. The lower the angle the greater the moment arm and, hence, the greater the counterbalancing moment. Once the magnitude of the counterbalancing moment is sufficient to overcome the gravitational force acting at nozzle coupler 118, couplers 118 and 120 and the nozzle mounted to nozzle coupler 118, will rotate upwardly (as viewed in FIG. 11) about horizontal axis B. Thus, the reaction force is no longer destabilizing to the monitor and, instead, repositions the nozzle to stabilize the monitor. However, left unchecked, the clockwise moment would continue to cause pivot member 132** to rotate upward.

To limit the upward rotation of coupler 120 and pivot member 132 about axis B, pivot coupler 120 includes a pair of shoulders 135 and 137. Shoulders 135 and 137 limit the pivoting of pivot coupler 118 about axis A and limit the pivoting of coupler 120 about pivot axis B. Although illustrated as an annular collar 124, stops may be provided by lugs, pins, or the like. In addition, monitor 110 includes one-way clutches as counterbalance devices 112 and 114 for each horizontal axes of rotation (A, B). Counterbalance devices 112, 114 allow pivoting in one direction but limit pivoting in the other direction by providing rotational stiffness in the other direction. In the illustrated embodiment, counterbalancing devices 112, 114 permit generally free upward rotation or clockwise rotation (as viewed in FIG. 11) about axes A and B, but limit downward rotation or counter-clockwise rotation (as viewed in FIG. 11).

As best understood from FIGS. 12-17, counterbalance device 112 includes a cylindrical member or trunnion 154, which is fixed to pivot member 130, and a clutch assembly 156 that is adapted to allow pivoting of coupler 118 about pivot member 130 about axis A in one direction but limits pivoting in the opposed direction. Clutch assembly 156 includes a housing 158 that is mounted to coupler 118 about cylindrical member 154. Cylindrical member 154 may be mounted to or formed as a part of pivot member 130. In the illustrated embodiment, the end of member 154 comprises a non-circular cross-section, such as a square or rectangular end, that is inserted into a similarly non-circular shaped opening formed in member 130 to thereby rotationally fix member 154 to member 130. In order to secure member 154 in member 130, device 112 includes a snap ring 161 (FIG. 12), described below. Alternately, the end of member 154 may be threaded and inserted into a corresponding threaded opening in member 130, with LOCKTITE or a lock washer to secure the connection.

Similarly, housing 158 may be mounted to or formed as part of socket 126*c* of coupler 118. Housing 158 includes a base wall 158*a*, which is positioned about cylindrical member 154 between a flange 154*a* of cylindrical member 154 and pivot member 130, and an annular wall 159, which extends from base wall 158*a* to form a cavity. Housing 158 is located about cylindrical member 154 by a mounting plate 158*b*, which is threaded onto the distal end of member 154 in opening 158*c*, such that wall 159 is spaced from and extends around cylindrical member 154. Snap ring 161 is mounted in an annular groove 159*a* formed in wall 159 and is positioned outwardly of plate 158*b* and secures member 154 to pivot member 130. Mounting plate 158*b*, however, is free from attachment to housing 158 and is coupled to and rotates with cylindrical member 154 when coupler 118 pivots about axis A. Positioned between plate 158*b* and flange 154*a* of cylindrical member 154 is a clutch wheel 160, a spring 162, and a friction washer 162*a*. In the illustrated embodiment, spring 162 comprises an annular plate spring 164, such as a BELLEVILLE spring, which is mounted to cylindrical member 154 and positioned between plate 158*b* and friction washer 162*a*, which is positioned adjacent wheel 160, to urge wheel 160 toward flange 154*a*. In addition, a friction washer 154*b* is positioned between wheel 160 and flange 154*a*. When coupler 118 pivots about axis A in a clockwise direction as viewed in FIG. 11, housing 158 will similarly pivot about axis A. However, cylindrical member 154, plate 158*b*, washers 162*a* and 164*b*, spring 162, and wheel 160 will remain stationary relative to pivot member 130. As will be more fully described below, however, when coupler 118 pivots about axis A in a counter-clockwise direction as viewed in FIG. 11, wheel 160 will bind against housing 158 to stop the rotation of housing 158 about axis A.

Figure 17:
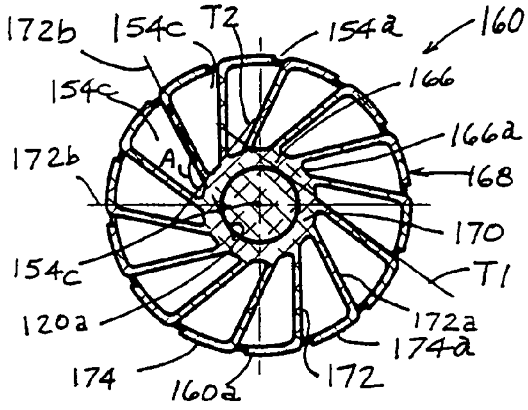
FIG. 17 is a cross-section taken along line XVII-XVII of FIG. 16.
Figure 15:
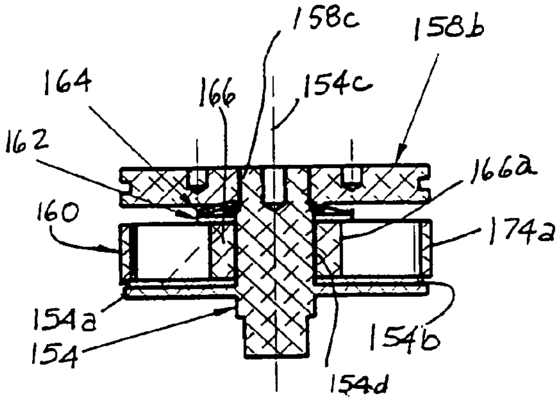
FIG. 15 is a cross-section view taken along line XV-XV of FIG. 14.

Wheel 160 is sized such that when wheel 160 is inserted into housing 158, the outer perimeter 160*a* of wheel 160 will compress to generate a slight interference with inner surface 158*a* of annular wall 159 of housing 158 to thereby generate a slight stiffness in the counter-clockwise direction as viewed in FIG. 17. As will be appreciated from the description that follows, wheel 160 is configured to allow substantially free rotation (with a relatively low stiffness) of housing 158 in one direction but limit rotation of housing 158 (with a significantly greater stiffness) in an opposed direction. For counterbalance device 114, as noted below, the opposite is true—the housing 158 is fixed and wheel 160 is configured to allow substantially free rotation of cylindrical member 154 in one direction but limit rotation of cylindrical member 154 in an opposed direction.

As best seen in FIG. 17, wheel 160 comprises a central body 166 with a plurality of projecting fins 168 that are arranged in a plane orthogonal to the central axis of cylindrical member 154 (or axis A). Body 166 and fins 168 are preferably monolithic to form a unitary integral part; however, it can be appreciated that fins 168 may also be mounted to body 166. Central body 166 comprises an annular member 170 that includes a central opening 170*a* for mounting wheel 160 onto cylindrical member 154. Fins 168 extend outwardly from central body 166 and, further, are angled at a non-orthogonal angle relative to the outer perimeter 166*a* of central body 166. Furthermore, each fin 168 comprises a generally L-shaped member, with a first portion 172 that extends from central body 166 and a second portion 174 that is angled with respect to first portion 172 to provide a surface for contacting inner surface 158*d* of wall 159 of housing 158. Furthermore, portions 174 are arranged in an annular arrangement and lie in a circle, which in their uninstalled configuration has a greater diameter than the inner diameter of housing 158. As note above, in this manner, when wheel 160 is inserted into housing 158, fins 168 will be compressed.

As noted above, fins 168 are oriented at a non-orthogonal angel with respect to central body 166. For example, each portion 172 may be oriented such that its leading edge 172*a* is generally aligned along a tangent line T1 with the outer perimeter of cylindrical member 154 such that portions 172 are generally aligned with the tangent lines. Alternately, or in addition, the central longitudinal axis of each portion 172 is angled at an obtuse angle A (as measured in counter-clockwise direction as seen in FIG. 17) with respect to tangent line T2 to central body 166.

Wheel 160 may be formed from a variety of different materials and is preferably formed from a durable, ductile material, such as a metal, including aluminum, steel, or a polymer, so that fins 168 can compress and, further, form springs. Preferably, when wheel 160 is formed from a metal, wheel 160 is formed from a stainless steel to avoid corrosion problems. The thickness of fins 168 can therefore vary greatly depending on the material and also depending on the desired stiffness of the clutch. Similarly, though illustrated as L-shaped members with generally rectangular cross-sections, fins 168 may have other configurations and cross-sections. Moreover, the number of fins can be varied. For example, the number of fins could be as low as one or two, with the other portion of the wheel body comprising a solid circular section, such as a solid hemisphere. It should be understood, for a given material, the thicker the fin the greater the spring rate of the fins and, hence, the greater the stiffness of the counterbalance devices.

In operation, when housing 150 is rotated about wheel 160 in a counter-clockwise direction (as viewed in FIG. 17), the friction between the inner surface of housing 158 and the contact surfaces 174*a* of portions 174 will generate a bending force at portions 172 such that fins 168 will compress or deflect in a clockwise direction so that wheel 160 is generally free to rotate in housing 158 (or housing is free to rotate about wheel). However, rotation of housing 158 in the counter clockwise direction will be limited because the friction force between outer surfaces 174*a* of portions 174 and housing 158 will tend to urge fins 168 to deflect in a counter-clockwise direction and hence extend radially outward and, therefore, bind against the inner surface 158*d* of housing 158. In effect, fins 168 act or function as beams when housing 158 is rotated in the clockwise direction (as viewed in FIG. 17) and, hence, deflect and compress and essentially act or function as a column when housing 158 is rotated in the counter clockwise direction (as viewed in FIG. 17).

To generate friction between flange 154*a* and wheel 160, counterbalance device 112 also includes a friction washer 154*b*, which is positioned between flange 154*a* and wheel 160. In this manner, when wheel 160 binds against housing 158, the friction between wheel 160 and flange 154*a* will couple cylindrical member 154 to wheel 160 and stop the pivoting of coupler 118 with respect to pivot member 130. However, once a sufficient force is applied to nozzle coupler 118 to overcome the friction between any one or more of the friction connections—that is between spring 162 and washer 162*a*, between washer 162*a* and wheel 160, between wheel 160 and washer 154*b*, between washer 154*b* and flange 158*a*—cylindrical member 154 will become decoupled to permit rotation of coupler 118 about axis A. It should be understood that the any one or more of the friction connections may contribute to or provide the slip.

Figure 12:
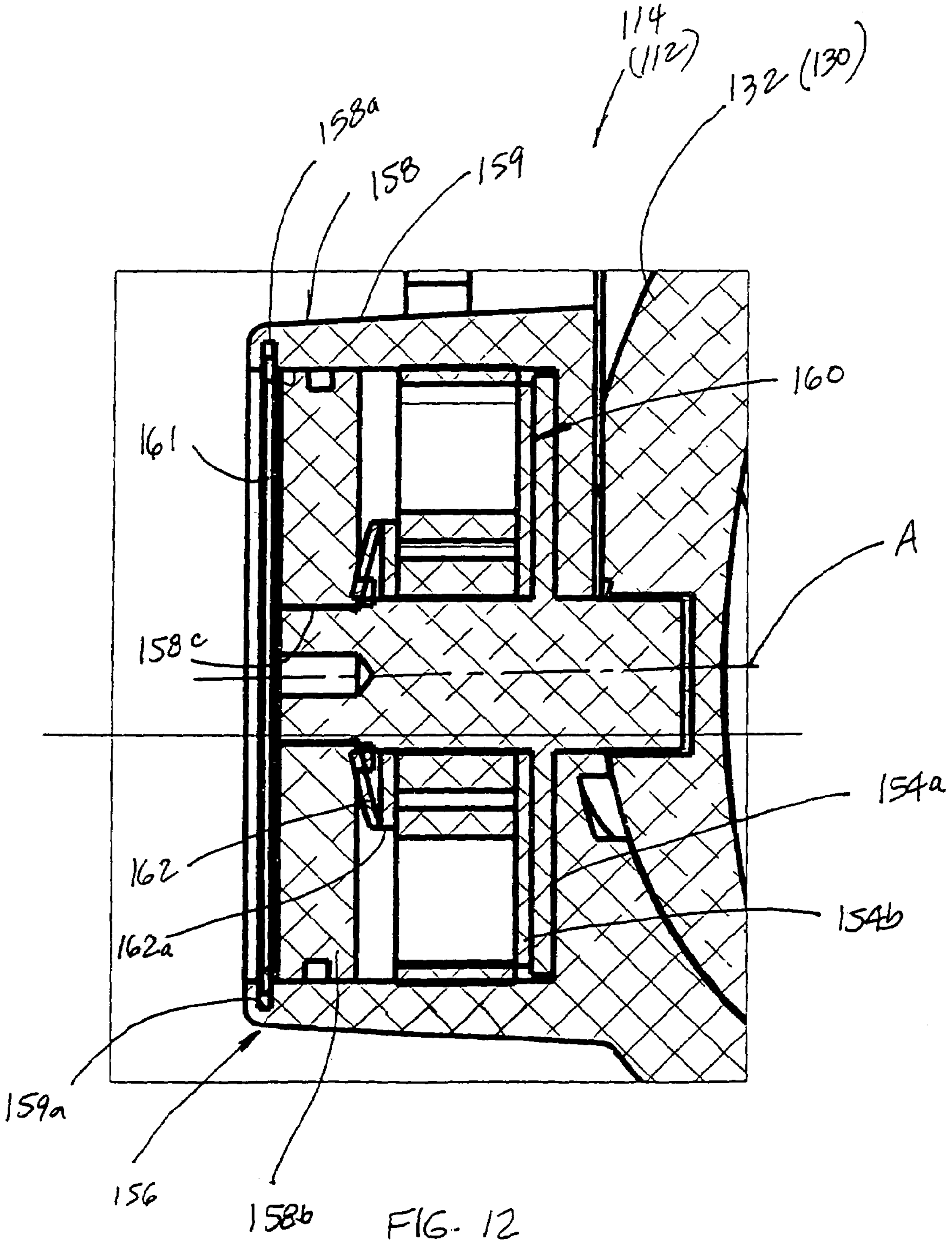
FIG. 12 is a cross-section taken along line XII-XII of FIG. 10.
Figure 14:
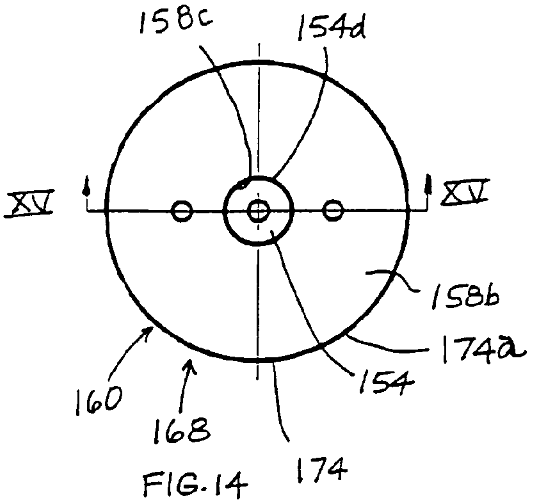
FIG. 14 is an elevation view of the opposed end of the device of FIG. 13.
Figure 13:
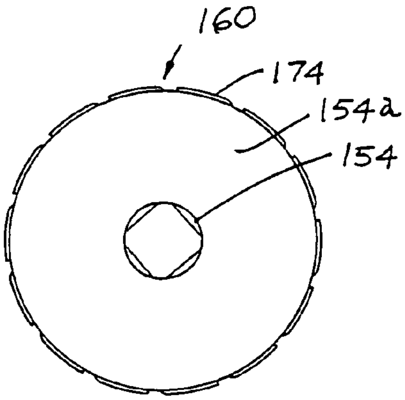
FIG. 13 is an elevation view of the counterbalance device of the monitor.
Figure 16:
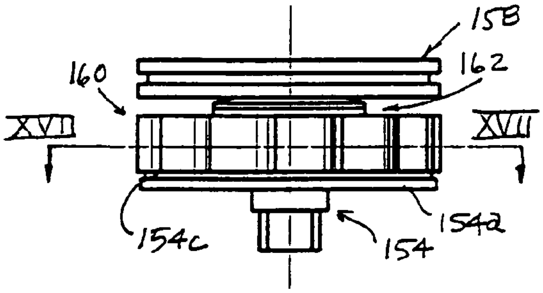
FIG. 16 is a side elevation view of the counterbalance device of FIG. 13.

As a result, nozzle coupler 118 may be rotated upward or clockwise (as viewed in FIG. 12) about pivot axis A but is subject to rotational stiffness when rotated downward or in the counterclockwise direction as viewed in FIG. 12. As would be understood, therefore, an operator of the monitor of the present invention can relatively easily adjust the upward movement of the nozzle mounted to the monitor, but to adjust the nozzle downward must exert a downward force that is sufficient to overcome the rotational stiffness provided by counterbalance device 112 about axis A and sufficient to overcome the counterbalancing moment created by the reaction force generated by fluid flowing through monitor 110 and the rotational stiffness provided by counterbalance device 114 about axis B, as described below.

Counter balance device 114 has the same construction as device 112 and includes cylindrical member or trunnion 154, which forms a pivot member and is fixed to pivot member 132, and a clutch assembly 156 that is adapted to allow pivoting of cylindrical member 154 and, hence, pivot member 132 about axis B in one direction but limits pivoting in the opposed direction. Similarly, cylindrical member 154 may be mounted to or formed as a part of pivot member 132, as described above, and housing 158 may be mounted to or formed as part of the socket of body 116.

In this manner, when coupler 120 pivots about axis B in a clockwise direction as viewed in FIG. 11, member 154, plate 158*b*, washers 162*a* and 164*b*, spring 162, and wheel 160 will similarly pivot about axis B. However, housing 158 will remain stationary relative to pivot member 120. As will be more fully described below, however, when coupler 120 pivots about axis B in a counter-clockwise direction as viewed in FIG. 11, wheel 160 will bind against housing 158 to stop the rotation of member 154 and hence coupler 120.

In operation, when wheel 160 is rotated in a counter clockwise direction (as viewed in FIG. 17), the friction between the inner surface of housing 158 and the contact surfaces 174*a* of portions 174 will generate a bending force to portions 172 such that fins 168 will compress or deflect in a clockwise direction so that wheel 160 is generally free to rotate in housing 158. However, rotation of wheel 160 in the opposed or clockwise direction will be limited because the friction force between outer surfaces 174*a* of portions 174 will tend to urge fins 168 to deflect in a counter-clockwise direction and hence extend radially outward and, therefore, bind against the inner surface 158*d* of housing 158. In effect, fins 168 act or function as beams when rotated in the counter-clockwise direction (as viewed in FIG. 17) and, hence, deflect and compress and essentially act or function as a column when rotated in the clockwise direction (as viewed in FIG. 17).

When wheel 160 binds against housing 158, the friction between wheel 160 and flange 154*a* will couple cylindrical member 154 to wheel 160 and stop the pivoting of coupler 120 with respect to body 116. However, once a sufficient force is applied to the nozzle or coupler 120 to overcome the friction between any one or more of the friction connections—that is between spring 162 and washer 162*a*, between washer 162*a* and wheel 160, between wheel 160 and washer 154*b*, between washer 154*b* and flange 158*a*—cylindrical member 154 will become decoupled to permit rotation of coupler 120 about axis B. It should be understood that the any one or more of the friction connections may contribute to or provide the slip.

As a result, nozzle coupler 120 may be rotated upward or clockwise (as viewed in FIG. 12) about pivot axis B but is subject to rotational stiffness when rotated downward or in the counterclockwise direction as viewed in FIG. 12. As would be understood, therefore, an operator of the monitor of the present invention can relatively easily adjust the upward movement of the nozzle mounted to the monitor, but to adjust the nozzle downward must exert a downward force that is sufficient to overcome the rotational stiffness provided by counterbalance device 114 to pivot coupler 120 about axis B.

Counterbalance devices 112 and 114, therefore, permit relatively free clockwise rotation of nozzle coupler 118 (as viewed in FIG. 12) about pivot member 130 and of pivot member 132 about housing 116, but limit counter-clockwise rotation of nozzle coupler 118 (as viewed in FIG. 12) about pivot member 130 and of pivot member 132 about housing 116 unless acted upon by a sufficient force to overcome the various friction connections in the devices.

As would be understood, in operation, when fluid flows through monitor 110 and flows with sufficient flow and/or pressure to generate a reaction force sufficient to counteract the gravitational force acting on the nozzle and nozzle coupler, the nozzle, nozzle coupler 118, and joint coupler 120 will pivot about axis B so as to stabilize the monitor. To move the nozzle downward, as note above, a downward manual force will need to be applied to the nozzle. Optionally, counterbalance devices 112 and 114 may be configured to provide a different stiffness to axes A and B to control where the rotation or pivoting will initiate. For example, by varying the coefficient of friction of the friction washers or by varying the normal forces applied by the mounting plate or cap 158*b* and/or spring 162. As would be understood, when a force is applied to the nozzle (or nozzle coupler) the initial rotation will occur at the axis with the lower stiffness.

Alternately, the friction washers may be eliminated and the wheel 160 may be fixed to member 154, with the slip being provided between the wheel and the housing. The stiffness of the device, therefore, would be a function of the stiffness of the fins and the friction between the fins and the housing. The stiffer the fins, the greater the spring rate. Hence, for stiffer counterbalance devices, the fins may be shortened and/or the fin thickness may be increased.

In preferred form, counterbalance device 112 generates a smaller rotational stiffness than counterbalance device 114 to assure rotation initiates at pivot axis A. Therefore, when a downward force is applied to the nozzle (or nozzle coupler) of sufficient magnitude to overcome the rotational stiffness provided by counterbalance device 112, the nozzle and nozzle coupler 118 will pivot about axis A. As previously noted, to limit rotation of nozzle coupler 118 about coupler 120, coupler 120 includes stops 135*c* and 135*d* (FIG. 11). Once nozzle coupler 118 is pivoted downward about axis A and contacts stop 135*d*, further application of a downward force, provided that it is of sufficient magnitude to overcome the counterbalance moment generated by the offset reaction force and the rotational stiffness of counterbalance device 114, will cause coupler 120 then to pivot about axis B. However, once the applied force is released, the offset reaction force will again return the nozzle and nozzle coupler to their raised position to assure that monitor 110 remains stable.

The degree of rotation of the nozzle coupler and, hence the nozzle, may be selected by the location of stops 135, 137. For example, in the illustrated embodiment, stops 135 and 137 are located to allow the nozzle and nozzle coupler 118 to rotate between about 60° and 30° at axis A. Once the nozzle coupler 118 reaches 30°, pivot member 126*c* will hit stop 135 and, thereafter, rotation will have to occur about axis B. Further rotation about axis B occurs until stop 137 contacts body 116. In the illustrated embodiment, stop 137 is positioned to permit coupler 120 to pivot about 10° so that the total range of motion for the nozzle is between about 20° and 60° as measured from the horizontal in the clockwise direction as viewed in FIG. 12. However, it should be understood that any of these angles may be varied.

Furthermore, it should be noted that the effect of the safety device of the present invention is self-limiting and that at a low flow and low pressure, reaction forces will be relatively low and, therefore, not be destabilizing for the monitor. Hence, the nozzle and nozzle coupler 118 may remain at a lowered angle. However, at high flow and high pressure, the reaction force will be such that it generates a counteracting moment to raise the nozzle and nozzle coupler so as to stabilize the monitor.

Optionally and preferably, monitor 110 also includes a ball valve 180, which may be used to control the flow of fluid through the monitor. For example, ball valve 180 may be operated by handle 182, which is pivotally mounted to body 116 and which operates the gate 184 (FIG. 11) of the ball valve 182 to open or close the inlet of body 116 when pivoted with respect to body 116.

Referring to FIGS. 18-22 the numeral 210 generally designates another embodiment of the monitor of the present invention. Monitor 210 is of similar construction to monitor 110 and includes a housing or body 216, a nozzle coupler 218, to which a nozzle or stream-shaper is mounted, and a pivot joint coupler 220, which pivotally mounts nozzle coupler 218 to body 216. For further details of the body 216, nozzle coupler 218, and pivot joint coupler 220, reference is made to the previous embodiment.

In a similar manner to the previous embodiment, nozzle coupler 218 is mounted to body 216 to provide multiple axis pivoting of the nozzle coupler and, hence, of the nozzle that is mounted to the nozzle coupler. In addition, the pivoting of nozzle coupler 218 about body 216 is controlled by counterbalance devices 212 and 214, which are of similar construction to counterbalance devices 112 and 114 of the previous embodiment. For further details of counterbalance devices 214 and 212, reference is made herein to the previous embodiment.

Figure 18:
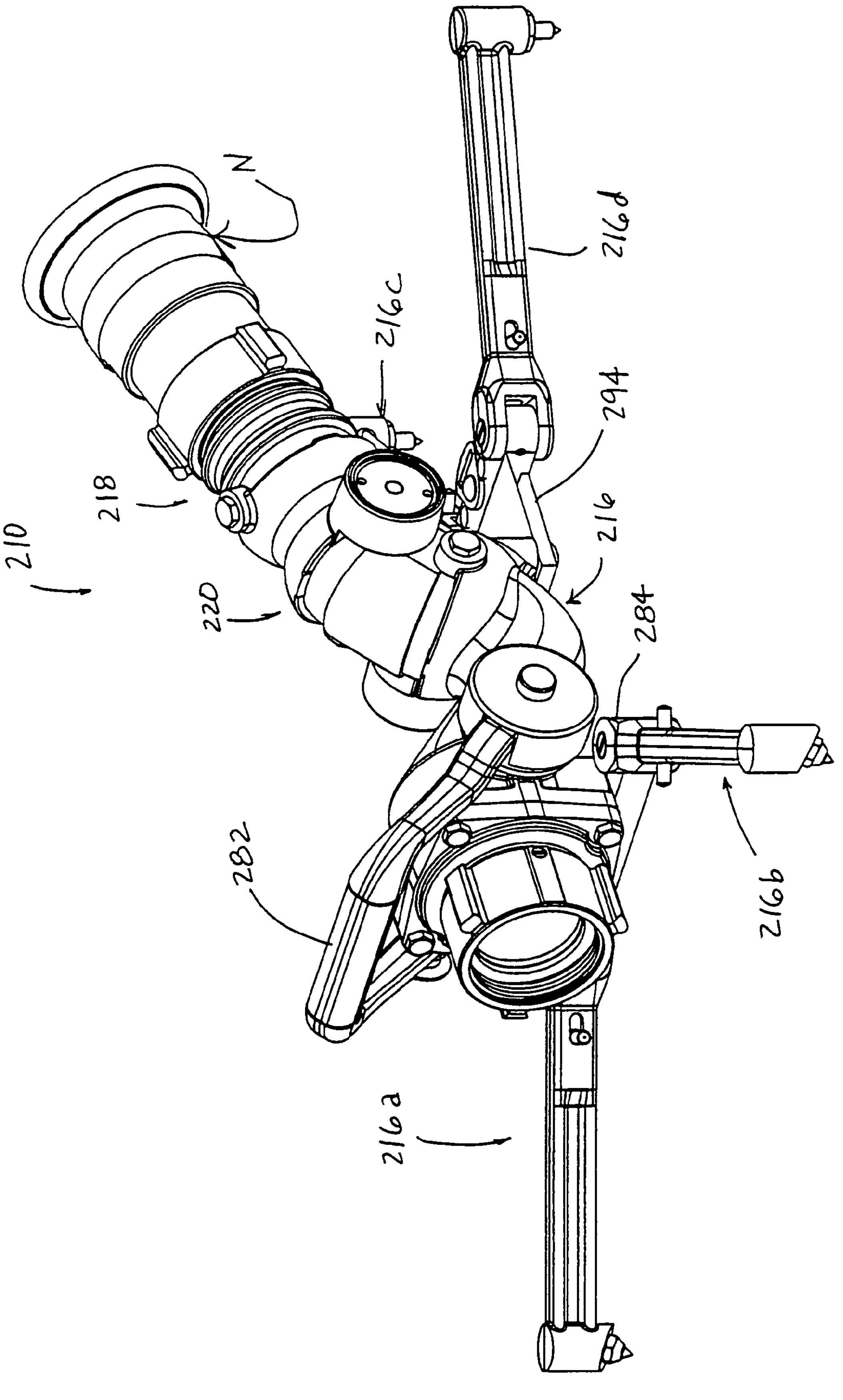
FIG. 18 is a perspective view of another embodiment of the monitor of the present invention.
Figure 19:
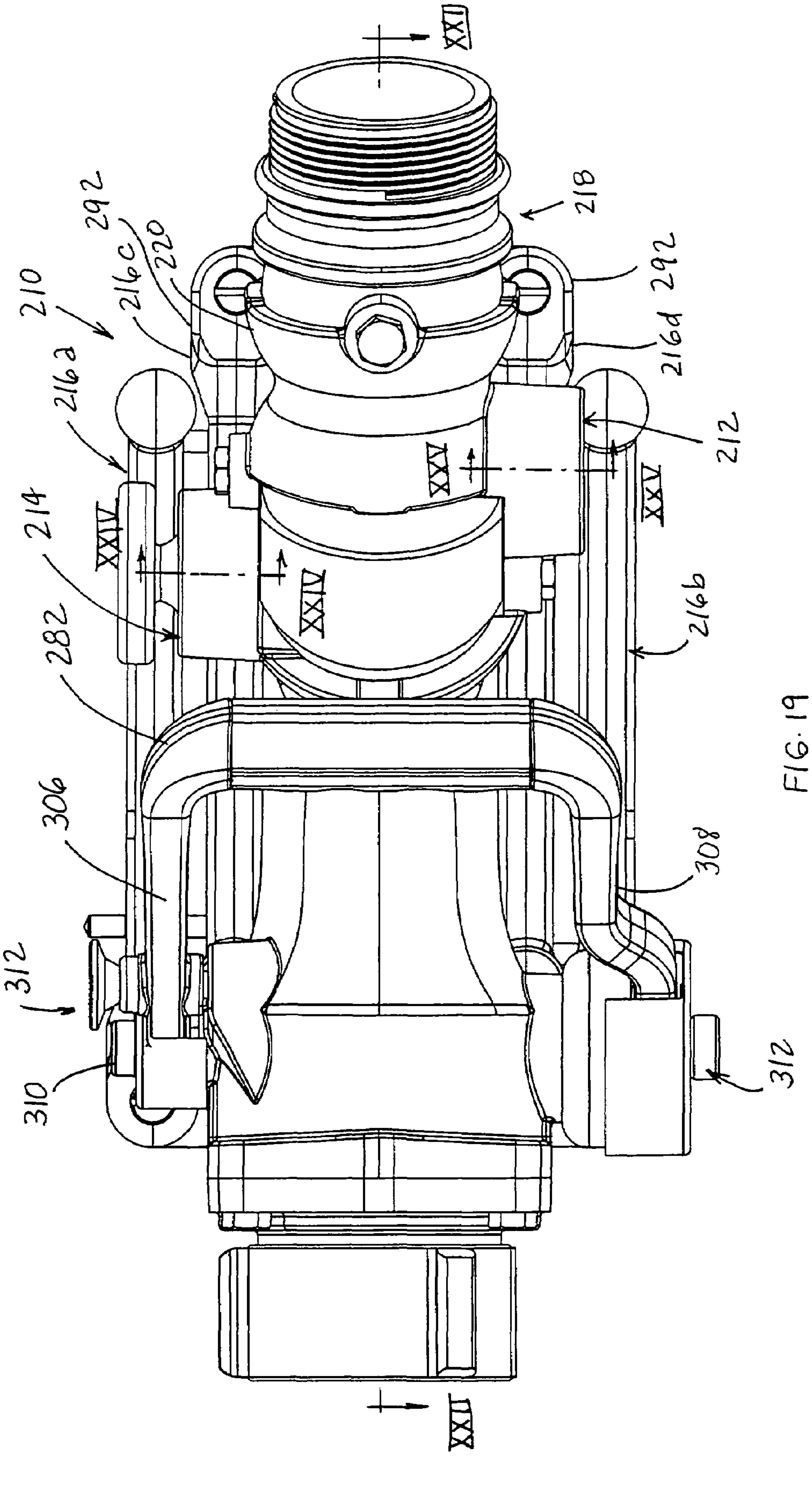
FIG. 19 is a top plan view of the monitor of FIG. 18 in its folded configuration.
Figure 20:
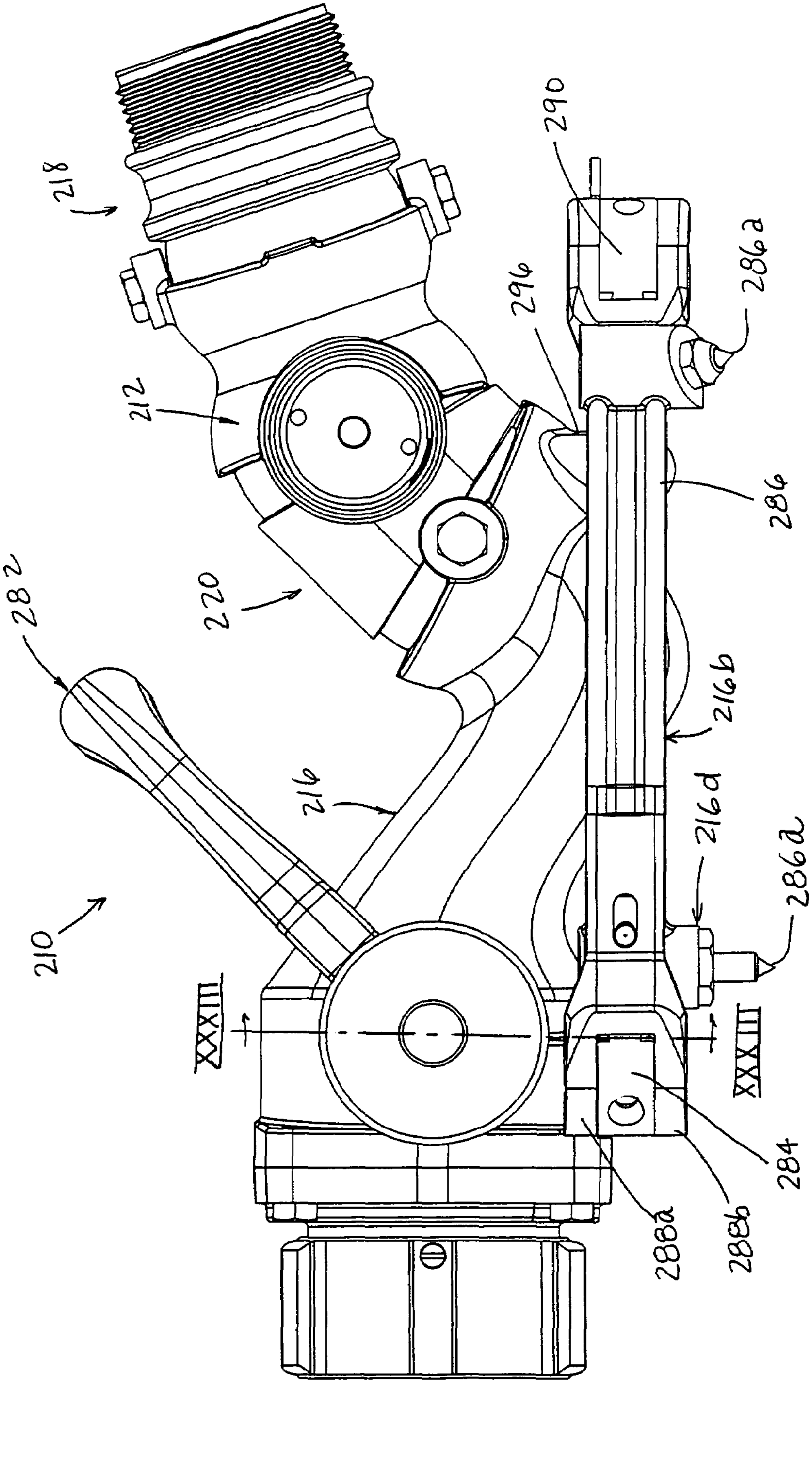
FIG. 20 is a side elevation view of the monitor in FIG. 19.
Figure 21:
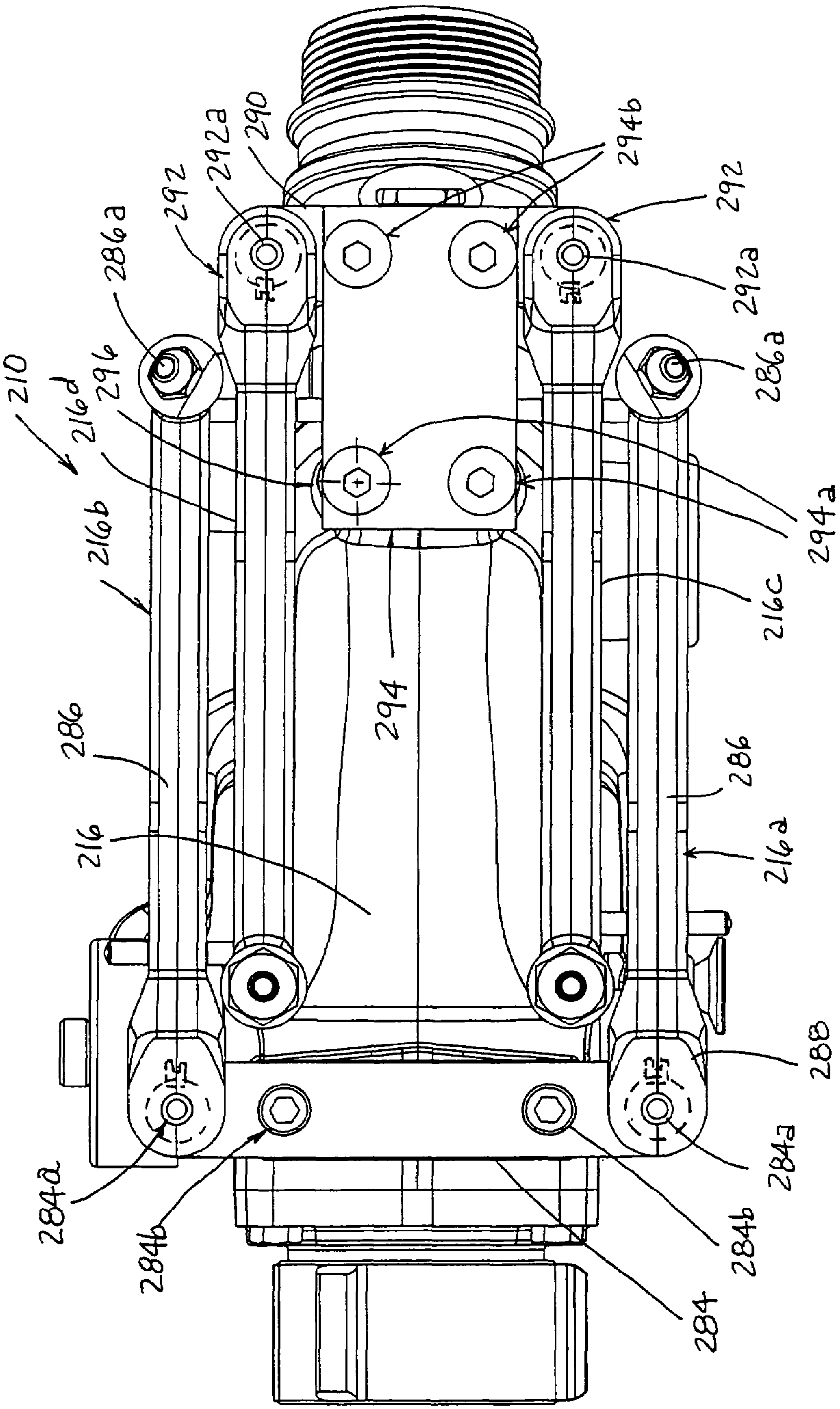
FIG. 21 is a bottom plan view of the monitor of FIG. 20 illustrating the folded arrangement of the monitor supports.
Figure 22:
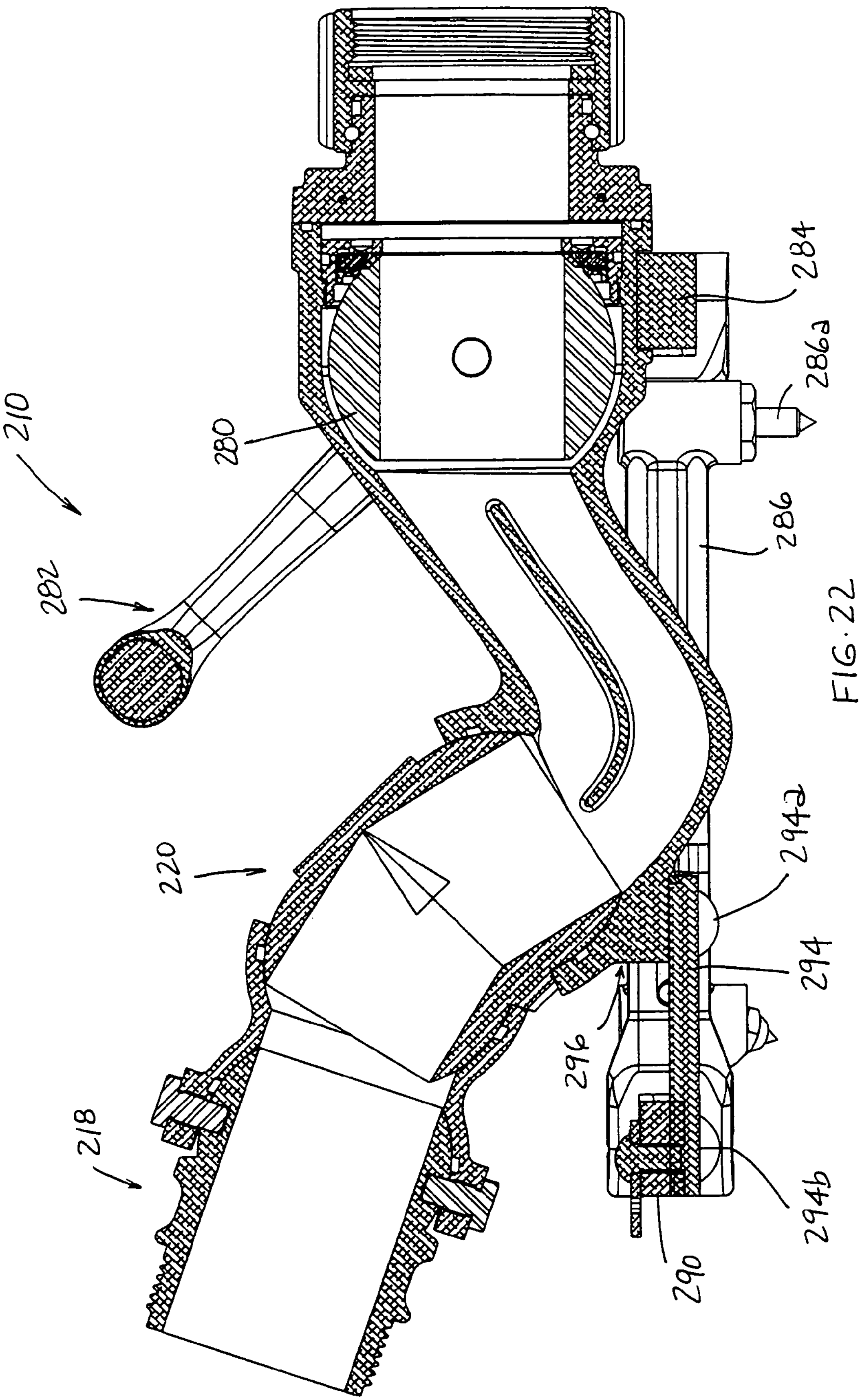
FIG. 22 is a cross-section view taken along XXII-XXII of FIG. 19.

In the illustrated embodiment, body 216 includes four monitor supports 216*a*, 216*b*, 216*c*, and 216*d*, which are pivotally mounted to monitor body 216 and which are configured to fold to form a compact arrangement, such as illustrated in FIGS. 20 and 21. As best seen in FIGS. 18 and 21, rearward supports 216*a* and 216*b* are pivotally mounted to a transverse mounting plate 284 by a plurality of pivot pins 284*a*, which in turn is mounted to the underside of body 216 by a plurality of threaded fasteners 284*b*. Each support 216*a*, 216*b* includes an elongate leg 286 with a ground spike 286*a* mounted to its distal end and a mounting bracket 288 at its proximal end, which is formed by a pair of spaced apart ears 288*a* and 288*b* that straddle the end of mounting plate 284. Brackets 288 preferably include lock pins (not shown) that are spring loaded for engagement with the mounting plate 284 when the respective leg 286 is fully deployed to its extended position, such as shown in FIG. 18, which are conventionally known.

Each forward support 216*c*, 216*d* similarly comprises an elongate leg 286 with ground spike 286*a* mounted to its respective distal end and a mounting bracket 292 at its proximal end. Brackets 292 are similarly pivotally mounted to a transverse mounting plate 290 by way of pivot pins 292*a*, which in turn is secured to body 216 by an extension mounting plate 294. One end of plate 294 is mounted to a downwardly depending flange 296 formed in body 216 by a pair of fasteners 294*a*. Mounting plate 290 is secured to the opposed end of mounting plate 294 by a pair of fasteners 294*b*. Brackets 292 similarly incorporate integral locked pins that are spring loaded for engagement with the respective mounting plate when the legs are fully deployed in their extended position, such as shown in FIG. 18.

As best understood from FIG. 21, supports 216*c* and 216*d* are mounted to mounting plate 290 inwardly of supports 216*a*, 216*b* so that when folded forward supports 216*c*, 216*d* are folded adjacent rear supports 261*a*, 216*b* to thereby provide a compact folded arrangement.

Figure 23:
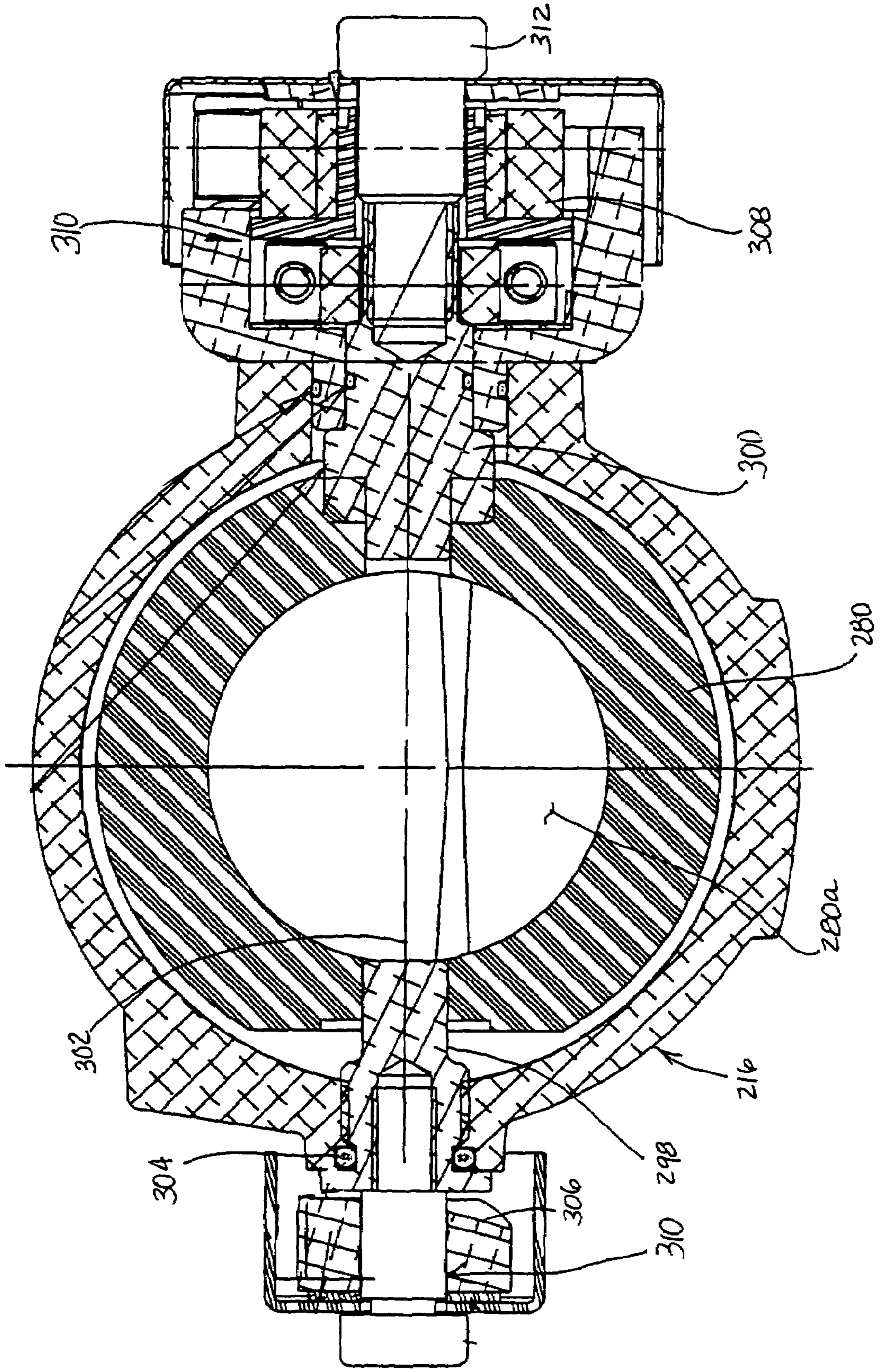
FIG. 23 is a cross-section view taken along line XXIII-XXIII of FIG. 20.
Figure 24:
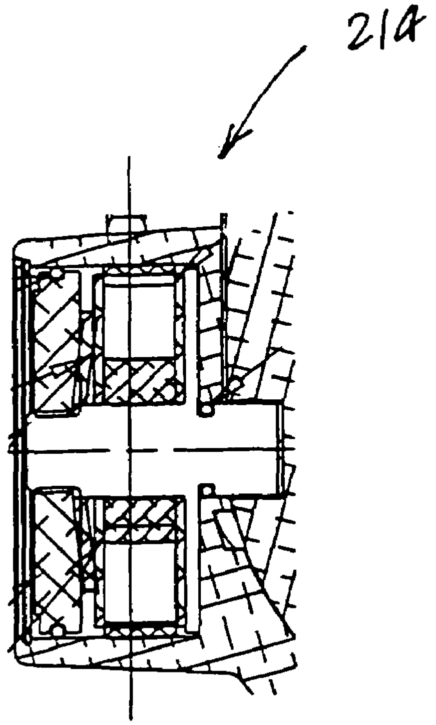
FIG. 24 is a cross-section view taken along line XXIV-XXIV of FIG. 19.
Figure 25:
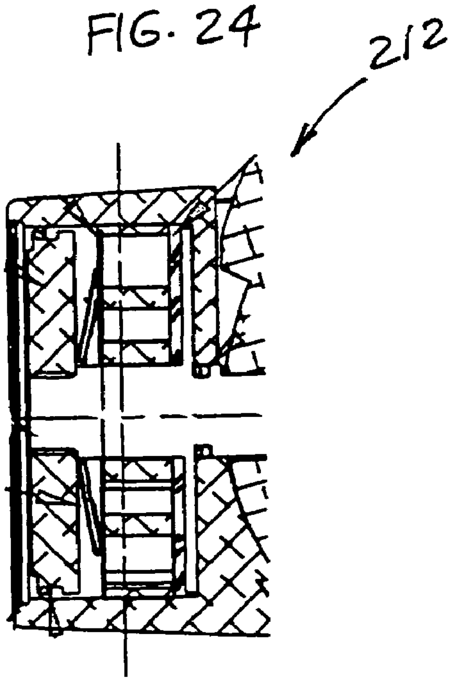
FIG. 25 is a cross-section view taken along line XXV-XXV of FIG. 19.

As described in reference to the previous embodiment, the flow of fluid through the monitor is preferably controlled by a ball valve 280, which his actuated to open, partially open, and close inlet 222*a* of body 216 by a handle 282, which is coupled to ball valve 280, as will be more fully described below. Referring to FIG. 23, ball valve 280 comprises a truncated spherical body with a transverse passage 280*a*, which is pivotally mounted in body 216 by a pair of pivot members 298 and 300. Pivot members 298 and 300 are mounted to ball valve 280 at opposed sides of the ball valve and are aligned along a pivot axis 302. Pivot member 298 extends through body 216 and is sealed therein by a O-ring seal 304. Handle 282 comprises a U-shaped handle with a pair of arms 306 and 308, which straddle body 216. Arm 306 is mounted to pivot member 298 by a threaded fastener 310. Arm 308 is similarly mounted to pivot member 300 by an actuator assembly 310 and a fastener 312, with actuator assembly 310 configured to allow valve 280 to be held in a throttle position—or partially open position—as desired.

Figure 26:
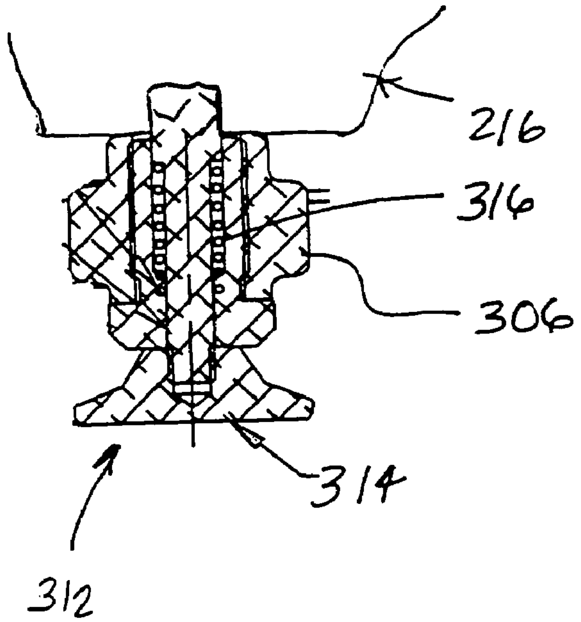
FIG. 26 is a cross-section view taken along line XXVI-XXVI of FIG. 19.

Referring to FIG. 26, handle 282 preferably includes a lock pin 312 with a handle 314 for actuation. Lock pin 312 is biased into a locked position by a coil spring 316 that urges the distal end of lock pin 312 into engagement with body 216 of monitor 210 to thereby lock the position so that handle 282 may be used also to carry the monitor without actuating the ball valve.

Because a suitable commercially available valve is available from Elkhart Brass under the trademark HYDRO-LOC, no further details of the ball valve are provided herein.

Accordingly, the present invention provides a one-way clutch that limits rotation of one member with respect to another member in one direction by providing a first stiffness in that direction and permits substantially free rotation in an opposed direction by providing a second, lower stiffness in the opposed direction. This is achieved with generally fewer components that tend to exhibit greater wear characteristics than prior one-way clutches.

From the foregoing, it should be appreciated that, although, described in reference to a counterbalance device for a fire fighting monitor, the one-way clutch of the present invention is not so limited and may be used in other applications, such as in oil drilling equipment, automobiles, motors, or the like. The monitor of the present invention provides a safety system that reduces, if not eliminates, the likelihood of the monitor tipping over or sliding due to the reaction force generated by the flow of fluid through the monitor. Moreover, the monitor uses or harnesses the reaction force to enhance the stability of the monitor by shifting or moving the reaction force. As would be understood, the degree of offset of the pivot axes of the pivot joint coupler will increase or decrease the magnitude of counterbalancing moment generated by the offset reaction force. Also, the point at which the counterbalancing force lifts the nozzle and the nozzle coupler will vary with the type of nozzle configuration being used and the flow rate and pressure of the fluid.

While one form of the invention has been shown and described, other forms will now be apparent to those skilled in the art. For example, as noted the monitor's pivot members may comprise ball or socket members. Furthermore, the number of pivot members, and hence pivot axes, may be increased or decreased. For example, a single pivot axis may be provided in which case the nozzle may be configured and angled to provide an offset so that the reaction force generated by the flow of fluid through the nozzle is offset from the pivot axis to create a similar counterbalancing moment. Therefore, it will be understood that the embodiments shown in the drawings and described above are merely for illustrative purposes, and are not intended to limit the scope of the invention, which is defined by the claims, which follow as interpreted under the principles of patent law including the doctrine of equivalents.

We claim:

1. A fire-fighting monitor comprising:

a first body having an internal passageway defining an inlet and an outlet;

a coupler having an internal passageway defining an inlet and an outlet, said coupler being pivotally mounted to said body at said outlet of said body wherein said internal passageway of said coupler is in communication with said internal passageway of said body, and said coupler having at least one pivot axis; and a counterbalance device, said counterbalance device comprising an annular member mounted to said first body at said pivot axis, said counterbalance device further comprising a pivot member mounted to said coupler and a second unitary body mounted about said pivot member, said second unitary body being adapted to engage and generate an interference with an inner surface of said annular member when said coupler is pivoted about said pivot axis in a first direction and adapted to release the interference with said inner surface of said annular member when said coupler is pivoted about said pivot axis in an opposed second direction from said first direction.

2. The monitor according to claim 1, wherein said second unitary body includes at least two fins, said fins being configured to engage and generate said interference with said inner surface of said annular member when said coupler is pivoted about said pivot axis in said first direction and adapted to release said interference with said inner surface of said annular member when said coupler is pivoted about said pivot axis in said second direction.

3. The monitor according to claim 2, wherein said fins each include a first leg and a second leg extending from and angled with respect to said first leg.

4. The monitor according to claim 3, wherein said second unitary body includes a central portion, each of said L-shaped fins comprising a first portion extending from said central portion and a second portion angled with respect to said first portion and being adapted to engage said inner surface of said annular member and generate the interference with said inner surface of said annular member when said coupler is pivoted about said pivot axis in said first direction and adapted to be released from the interference with said inner surface of said annular member when said coupler is pivoted about said pivot axis in said second direction.

5. The monitor according to claim 4, wherein said pivot member includes an outer perimeter, each of said fins being generally aligned with a tangent line to said outer perimeter.

6. The monitor according to claim 5, wherein each of said first portions are generally aligned with the tangent line to said outer perimeter.

7. The monitor according to claim 1, wherein said second unitary body comprises an aluminum body.

8. The monitor according to claim 2, wherein said fins expand outwardly toward said annular member and function as columns when said coupler is pivoted in said first direction to thereby bind against said inner surface of said annular member and compress and function as beams when said coupler is pivoted in said second direction wherein said fins release said interference with said inner surface of said annular member.

9. The monitor according to claim 2, wherein said second unitary body includes at least three fins.

10. The monitor according to claim 9, wherein said second unitary body includes at least four fins.

11. The monitor according to claim 2, wherein said fins are configured to expand outwardly when said coupler is pivoted in said first direction and to deflect and compress inwardly when said coupler is pivoted about said pivot axis in said second direction.

12. The monitor according to claim 1, wherein said second unitary body includes a plurality of springs, said springs being compressible when said coupler is pivoted in said second direction and being adapted to be substantially rigid when said coupler is pivoted in said first direction wherein said springs bind against said inner surfaces of said annular member.

13. The monitor according to claim 2, wherein said second unitary body and said fins are monolithic to thereby form a unitary part.

14. The monitor according to claim 1, wherein said annular member comprises a housing.

15. The monitor according to claim 2, wherein said pivot member has an outer perimeter, each of said fins being generally aligned with a tangent line to said outer perimeter of said pivot member.

16. The monitor according to claim 15, wherein said fins expand outwardly toward said annular member and function as columns when said coupler is pivoted in said first direction to thereby bind against said inner surface of said annular member and compress and function as beams when said pivot member is pivoted in said second direction wherein said fins release said interference with said inner surface of said annular member.

17. The monitor according to claim 1, wherein said second unitary body comprises a wheel.

18. The monitor according to claim 17, wherein said wheel includes an outer perimeter, said outer perimeter generating said interference with and contacting said inner surface of said annular member.

19. The monitor according to claim 18, wherein said wheel includes a plurality of fins, ends of said fins being configured to generate said interference and contact said inner surface.

20. The monitor according to claim 3, wherein said first legs extend outwardly from said pivot member, and said second legs are generally tangent to said inner surface of said annular member.

21. The monitor according to claim 3, wherein said first legs have a generally uniform thickness along their respective lengths.

* * * * *

UNITED STATES PATENT AND TRADEMARK OFFICE

CERTIFICATE OF CORRECTION

PATENT NO. : 7,703,545 B2
APPLICATION NO. : 12/234194
DATED : April 27, 2010
INVENTOR(S) : Eric Combs et al.

It is certified that error appears in the above-identified patent and that said Letters Patent is hereby corrected as shown below:

Title Page

(74) Attorney, Agent, or Firm:

"Van Dyle, Gardner, Linn & Burkhart, LLP" should be --Van Dyke, Gardner, Linn & Burkhart, LLP--

<u>Column 1</u>
Line 3, Insert --of -- after "application"

Signed and Sealed this
Fifteenth Day of February, 2011

David J. Kappos
*Director of the United States Patent and Trademark Office*